United States Patent
Elwany

(10) Patent No.: US 10,867,524 B1
(45) Date of Patent: Dec. 15, 2020

(54) CLASSROOM PRESENTATION AND RECORDING SYSTEM

(71) Applicant: M&A Technology, Inc., Carrollton, TX (US)

(72) Inventor: Magdy Elwany, Dallas, TX (US)

(73) Assignee: M&A Technology, Inc., Carrollton, TX (US)

( * ) Notice: Subject to any disclaimer, the term of this patent is extended or adjusted under 35 U.S.C. 154(b) by 396 days.

(21) Appl. No.: 15/876,937

(22) Filed: Jan. 22, 2018

Related U.S. Application Data

(63) Continuation of application No. 14/188,648, filed on Feb. 24, 2014, now abandoned.

(60) Provisional application No. 61/775,520, filed on Mar. 9, 2013, provisional application No. 61/768,392, filed on Feb. 22, 2013.

(51) Int. Cl.
*G09B 5/06* (2006.01)
*G06F 1/16* (2006.01)
*G06F 1/18* (2006.01)

(52) U.S. Cl.
CPC .......... *G09B 5/067* (2013.01); *G06F 1/1605* (2013.01); *G06F 1/182* (2013.01)

(58) Field of Classification Search
CPC .... G09B 5/00; G09B 5/06; A47B 2200/0073; A47B 55/00; A47B 96/06; H04N 7/142; H04N 5/64; B65G 1/04
See application file for complete search history.

(56) References Cited

U.S. PATENT DOCUMENTS

| | | |
|---|---|---|
| 4,191,433 A | 3/1980 | Rampp |
| 5,176,520 A | 1/1993 | Hamilton |
| 5,489,938 A | 2/1996 | Maruyama |
| 5,746,488 A | 5/1998 | LaCour |
| 5,758,935 A | 6/1998 | Coonan |
| 6,545,863 B2 | 4/2003 | Huggins |
| 6,904,451 B1 | 6/2005 | Orfitelli |
| 7,029,079 B2 | 4/2006 | Holt |

(Continued)

OTHER PUBLICATIONS

Office Action, dated Jan. 4, 2016, by the USPTO, re U.S. Appl. No. 14/188,648.

(Continued)

*Primary Examiner* — Jerry-Daryl Fletcher
(74) *Attorney, Agent, or Firm* — Bill R. Naifeh

(57) ABSTRACT

Embodiments of a several types of teaching or presentation stations are disclosed. Such disclosures may include a portable presentation station, the presentation station including: a touch screen display, a computer controller in communication with the touch screen display, a first human interface input device in communication with the computer controller, a second human interface input device in communication with the computer controller, a third human interface input device in communication with the computer controller, a document camera in communication with the computer controller, at least one light source operatively coupled to the document camera, a tray for the first human interface device and the second human interface device, a shelf to hold at least the third human interface device, a radio in communication with the computer controller, a document camera positioned to generally opposed the touch screen display, and in communication with the computer controller.

10 Claims, 20 Drawing Sheets

(56) References Cited

U.S. PATENT DOCUMENTS

| | | |
|---|---|---|
| 7,800,914 B2 | 9/2010 | Dully |
| 2001/0048464 A1 | 12/2001 | Barnett |
| 2002/0030966 A1 | 3/2002 | Huggins |
| 2003/0202317 A1 | 10/2003 | Jans |
| 2008/0106173 A1* | 5/2008 | Konopka ................. B65G 1/04 312/35 |
| 2010/0199228 A1 | 8/2010 | Latta |
| 2011/0167103 A1 | 7/2011 | Acosta |
| 2012/0202185 A1 | 8/2012 | Jabara |
| 2013/0094423 A1 | 4/2013 | Wengrovitz |
| 2013/0100944 A1 | 4/2013 | Kwon |
| 2013/0111363 A1 | 5/2013 | Linton |
| 2014/0022920 A1 | 1/2014 | Dua |

OTHER PUBLICATIONS

Final Rejection, dated Jun. 3, 2016, by the USPTO, re U.S. Appl. No. 14/188,648.

Office Action, dated Mar. 29, 2017, by the USPTO, re U.S. Appl. No. 14/188,648.

Office Action, dated Sep. 21, 2017, by the USPTO, re U.S. Appl. No. 14/188,648.

* cited by examiner

CLASSROOM PRESENTATION AND RECORDING SYSTEM

CROSS REFERENCE TO RELATED APPLICATIONS

This application is a continuation of U.S. application Ser. No. 14/188,648, filed on Feb. 24, 2014, entitled "A MULTIMEDIA SPEAKING AND TEACHING SYSTEM" which claims the benefit of the filing date of U.S. provisional patent application Ser. No. 61/768,292, filed on Feb. 22, 2013, entitled "A MULTIMEDIA SPEAKING AND TEACHING SYSTEM," and also claims the benefit of U.S. provisional patent application Ser. No. 61/775,520, filed on Mar. 3, 2013 entitled "A MULTIMEDIA SPEAKING AND TEACHING SYSTEM," all the disclosures of which are hereby incorporated by reference for all purposes.

TECHNICAL FIELD

The invention relates in general to presentation podiums and systems, and specifically to a multimedia speaking and teaching system.

BACKGROUND INFORMATION

Currently, in an educational environment, there are different systems for projecting video and audio. For instance, there may be an audio system comprising a microphone, amplifier, and speakers. Additionally, there may be an overhead projector, and/or a digital projector connected to some form of computer, such as a laptop. Often such systems are not interconnected and must be moved from room to room. Occasionally, such systems are permanently installed in a classroom—which makes upgrading or moving the systems difficult if not impractical.

Additionally, facilities are often renovated. During a renovation, speakers, speaker cables, network cables must be torn out and replaced at great expense to the facility's owner—such as a school system.

What is needed, therefore, is a device which integrates such systems into one synchronized system which can be easily moved from classroom to classroom, easy to use, and can be secured when not in use.

SUMMARY

In response to these and other problems, in one embodiment, there is a system including a securable enclosure, a projector, a document camera, a computer, a touch interface, an amplifier, a microphone system. In certain embodiments, the system may also have wired or wireless network connectivity and also include a wireless hotspot or its own wireless network to allow communication with portable computers used by the audience or students (such as notebook computers or tablet computers).

These and other features, and advantages, will be more clearly understood from the following detailed description taken in conjunction with the accompanying drawings. It is important to note the drawings are not intended to represent the only aspect of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counter-clockwise, right, and left, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Figure 1:
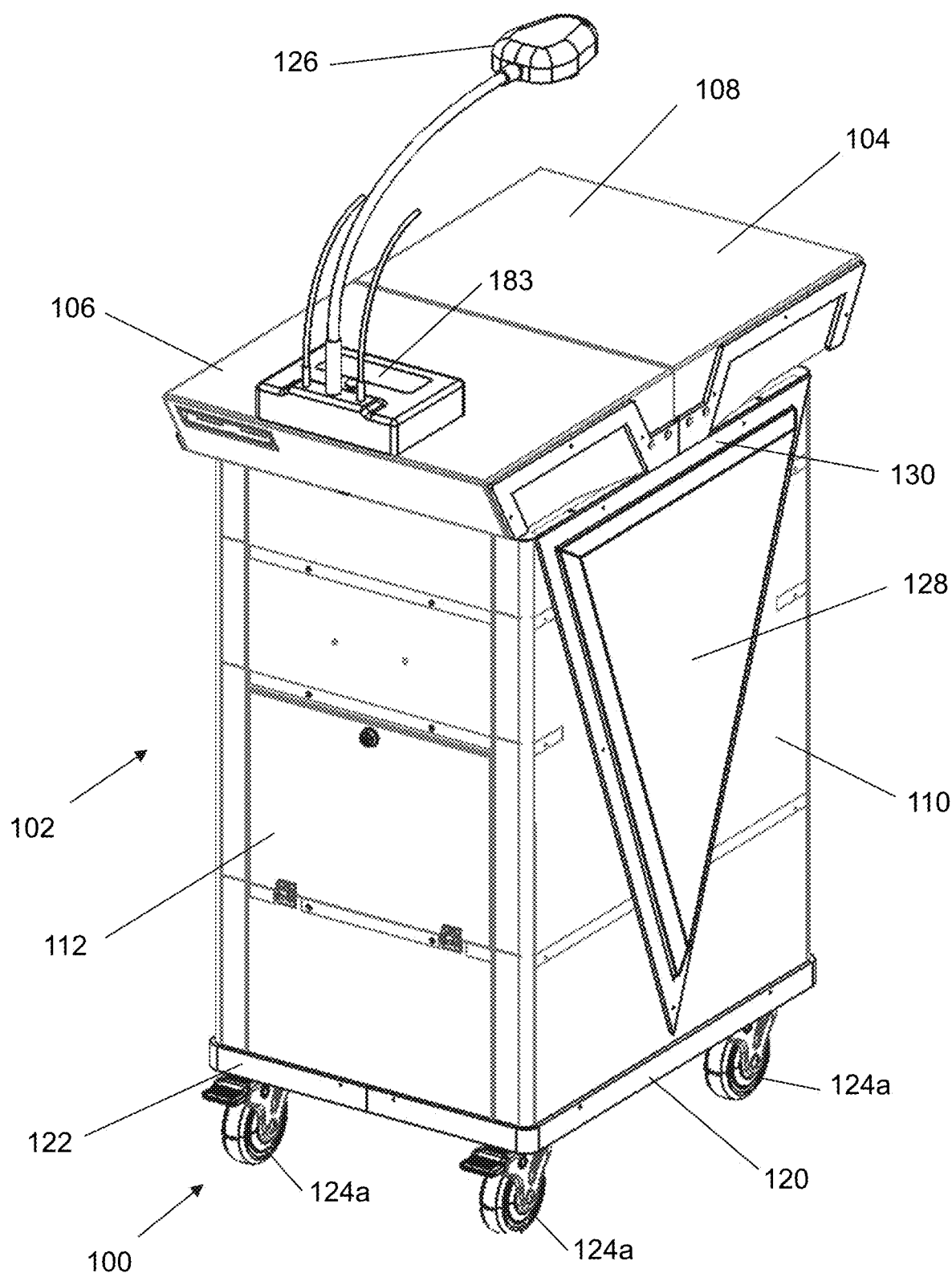
FIG. 1. is a front right isometric view illustrating one embodiment of an educational multimedia station in a first or closed configuration which incorporates one or more aspects of the present invention.
Figure 2:
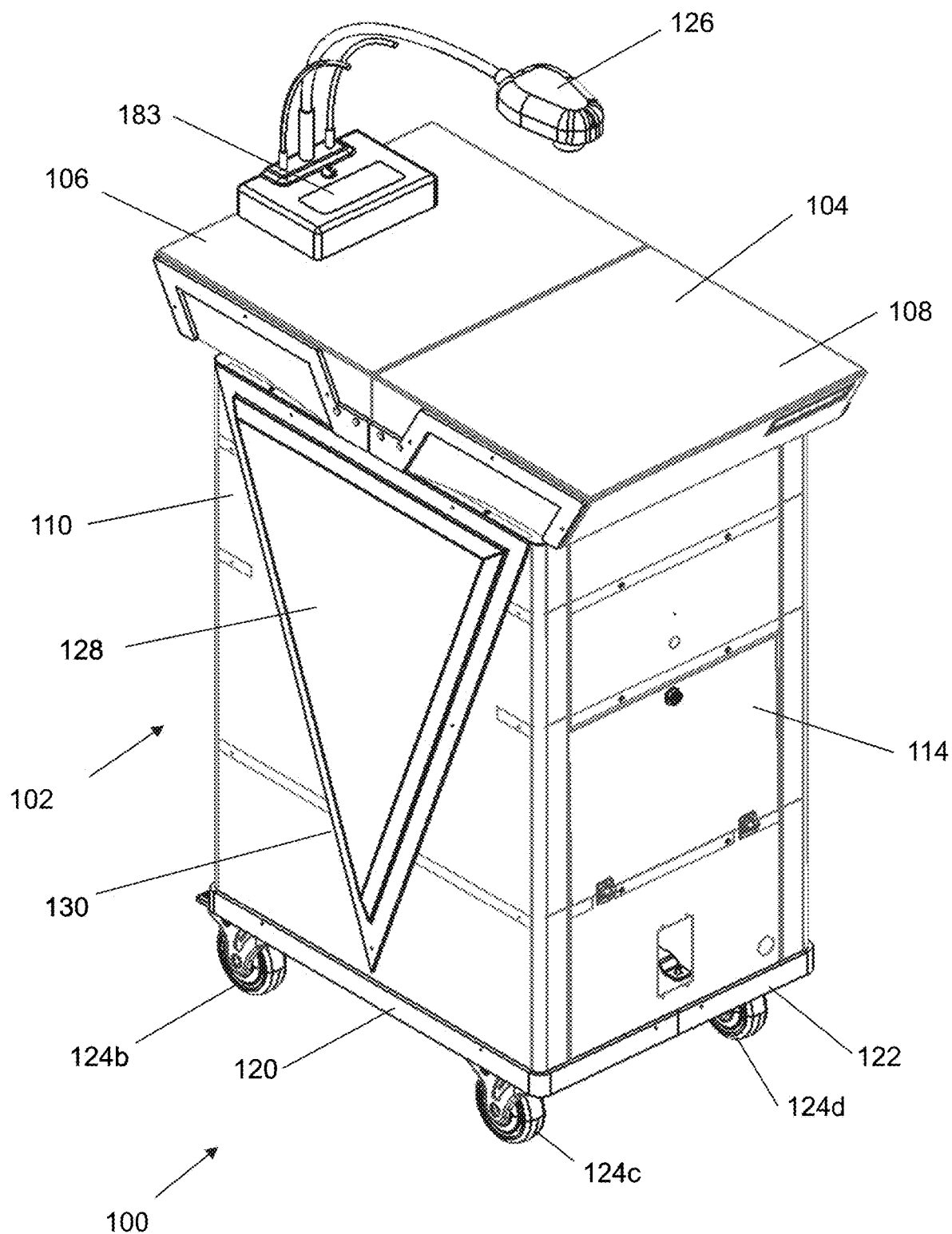
FIG. 2 is a front left isometric view illustrating the educational multimedia station of FIG. 1 in a first or closed configuration which incorporates one or more aspects of the present invention.
Figure 3:
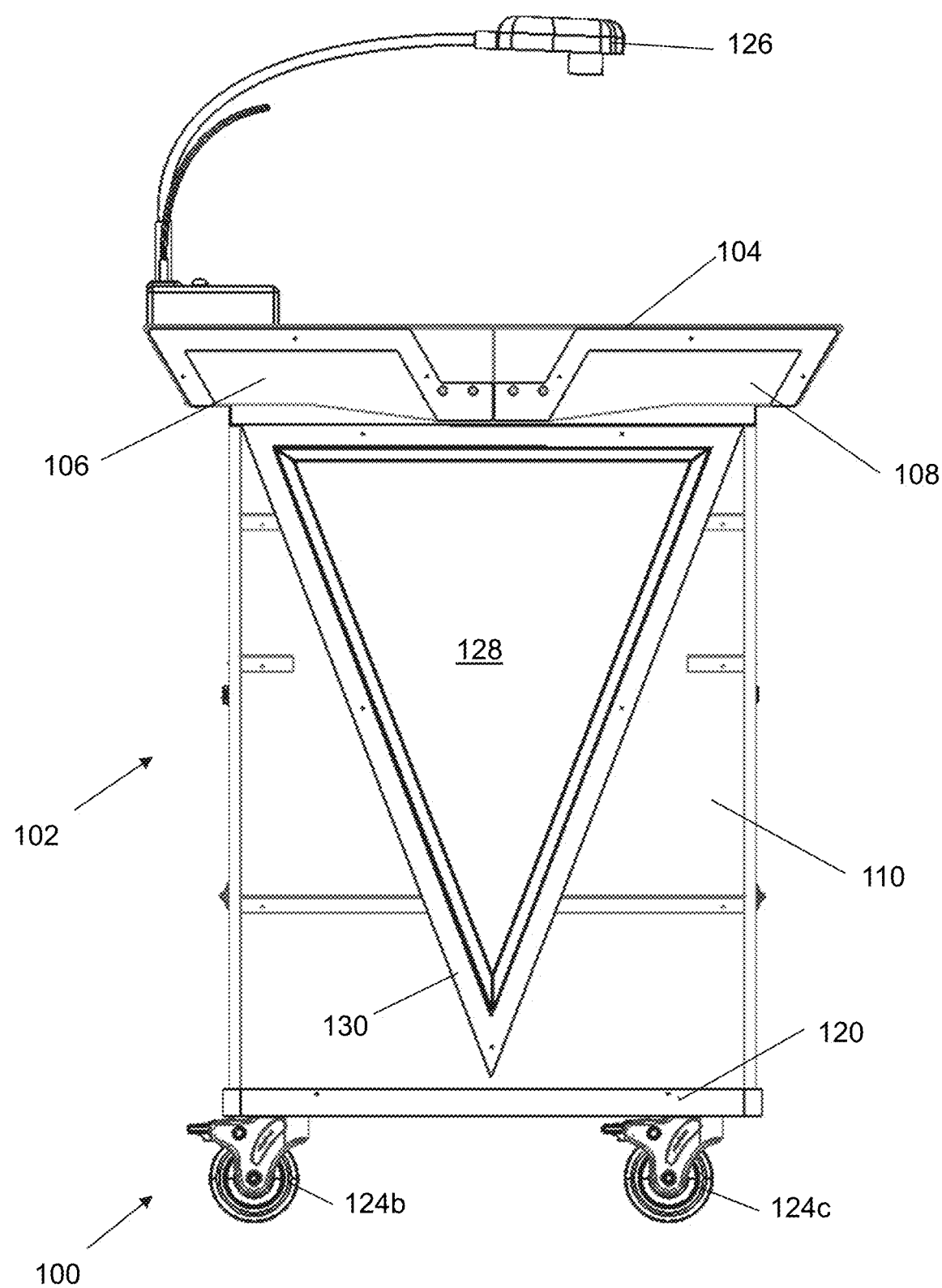
FIG. 3 is a front view illustrating the embodiment of an educational multimedia station of FIG. 1 in a first or closed configuration.
Figure 4:
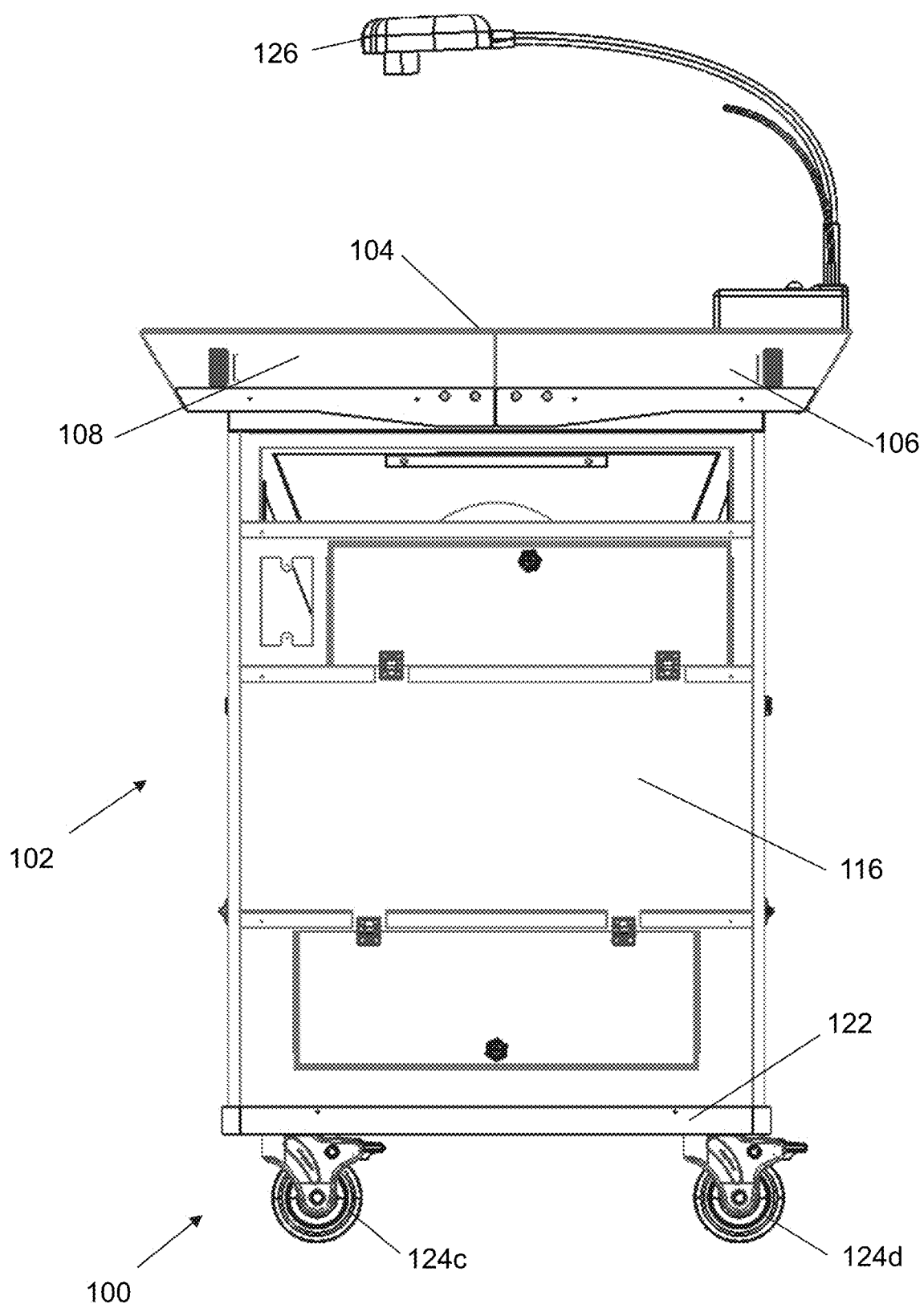
FIG. 4 is a back view illustrating the embodiment of an educational multimedia station of FIG. 1 in a first or closed configuration.

Turning now to FIGS. 1 through 4, there is presented one embodiment of a multimedia station 100 in a first or closed configuration. FIG. 1. is a front left isometric view of the multimedia station 100. FIG. 2 is a front right isometric view of the multimedia station 100. FIG. 3 is a front view illustrating of the multimedia station 100. FIG. 4 is a back view illustrating of the multimedia station 100.

As illustrated, the multimedia station 100 comprises a generally rectangular enclosure 102 comprising a series of panels or wrappers having, as will be discussed later, a plurality of doors and openings for access to various components. Generally, the enclosure 102 encloses a projector, a computer, a touch interface, an amplifier, a microphone, a speaker, a wired or wireless network interface, and a radio which allows the station to act as a wireless access point.

A top surface 104 comprises a first slideable tray 106 and a second slideable tray 108. The first slideable tray 106 and the second slideable tray 108 are coupled to rails and plates which are in turn coupled to front wrapper 110. The slideable trays 106 and 108 are also coupled to supports, such as plates or rails which allow the slideable trays 106 and 108 to move from a first or closed position illustrated in FIG. 1 to a second or open position illustrated in FIG. 7.

The front wrapper 110 is coupled to the support structure for the first and second slideable trays 106 and 108 and a first side wrapper 112 as illustrated in FIG. 1. Turning now to FIG. 2, it can be seen that the front wrapper 110 is also coupled to a second side wrapper 114. The side wrappers 112 and 114 are coupled to a rear or back wrapper 116, as illustrated in FIG. 4. The front wrapper 110, back wrapper 116, first side wrapper 112, and second side wrapper 114 are all coupled to a bottom plate 118 (not shown in FIGS. 1 through 4). The intersection of the wrappers and the bottom plate 118 are covered by a front bottom trim 120 and a back bottom trim 122. In certain embodiments, all of components of enclosure 104 (e.g., the first slideable tray 106, the second slideable tray 108, the front wrapper 110, the first side wrapper 112, the second side wrapper 114, the rear wrapper 116, the bottom plate 118, the front trim 120 and the back trim 122 are made formed from metal, such as an aluminum alloy, for durability in possibly harsh and abusive environments.

In certain embodiments, the bottom plate 118 may be coupled to a plurality of rollers or castors, such as rollers 124a through 124d. The rollers 124a-124d allow a user to push the multimedia station 100 from classroom to classroom and to position the station to the optimal location within the classroom. In certain embodiments, at least two rollers have breaks to keep the multimedia station 100 in place once the it is in the proper location. In other embodiments, Teflon sliders, retractable rollers, or other movement means of achieving portability may be employed to allow a user to easily move the station. This portability allows the school system to place the station in the class-rooms where and when they are needed.

In certain embodiments, a document camera 126 may be securely attached to either the slideable tray 106 or 108. The document camera 126 allows the user to place a document on the surface 104 or surface 134. The camera 126 will then send a video signal to the station's digital projector 144 so that audience can see the document placed on the surface 104. In certain embodiments, document camera allows a user to take pictures of text book pages or objects and include them in the video for students to review later.

In certain embodiments, there may be a front grill 128 which is removeably coupled to a grill trim 130 attached to the front wrapper 110. There may be one or more loudspeakers (not shown) behind the front grill. The front grill allows sound to pass yet protects the loudspeaker and presents a more aesthetic appearance.

Figure 5:
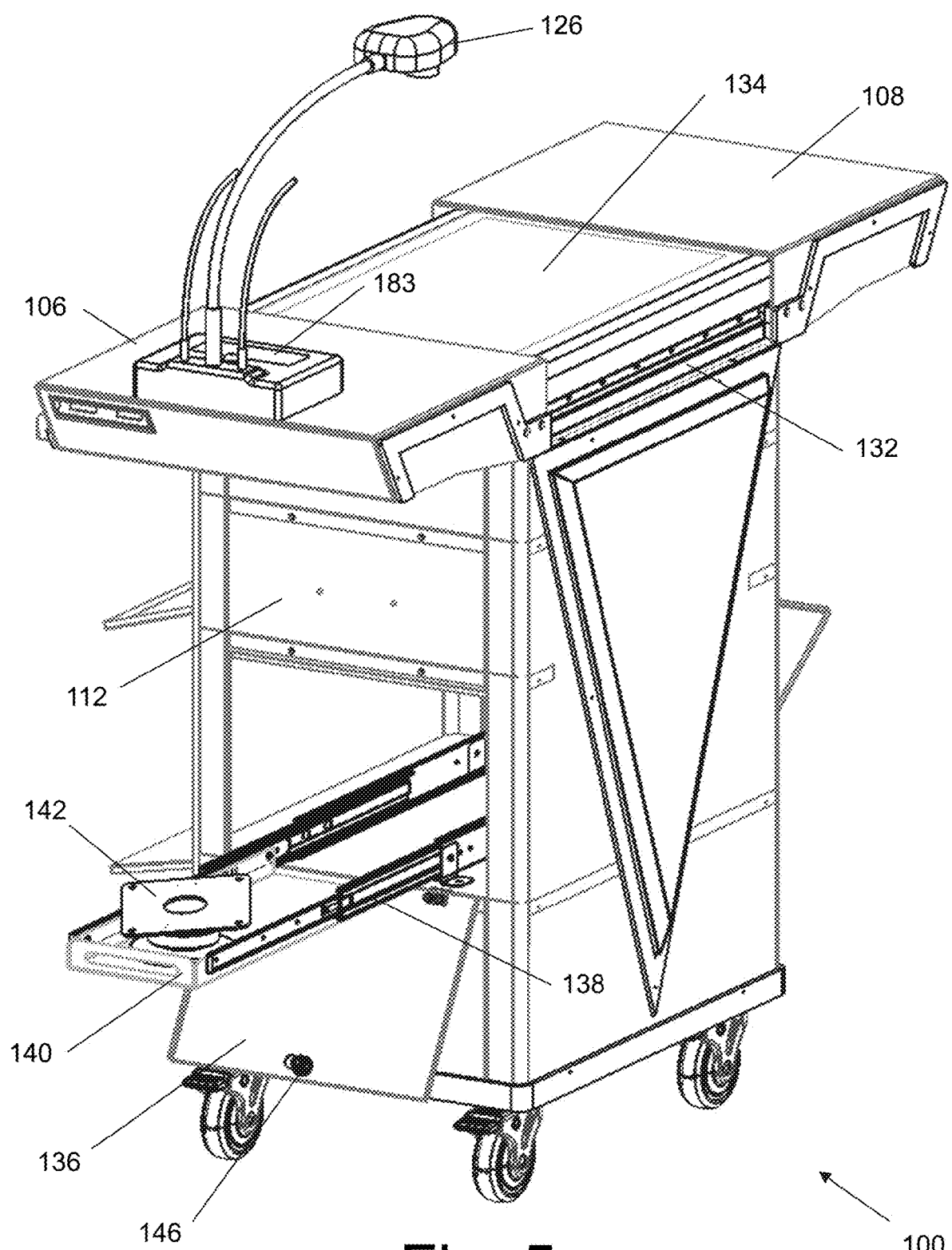
FIG. 5 is a front right isometric view illustrating the educational multimedia station of FIG. 1 in a second or open configuration.
Figure 6:
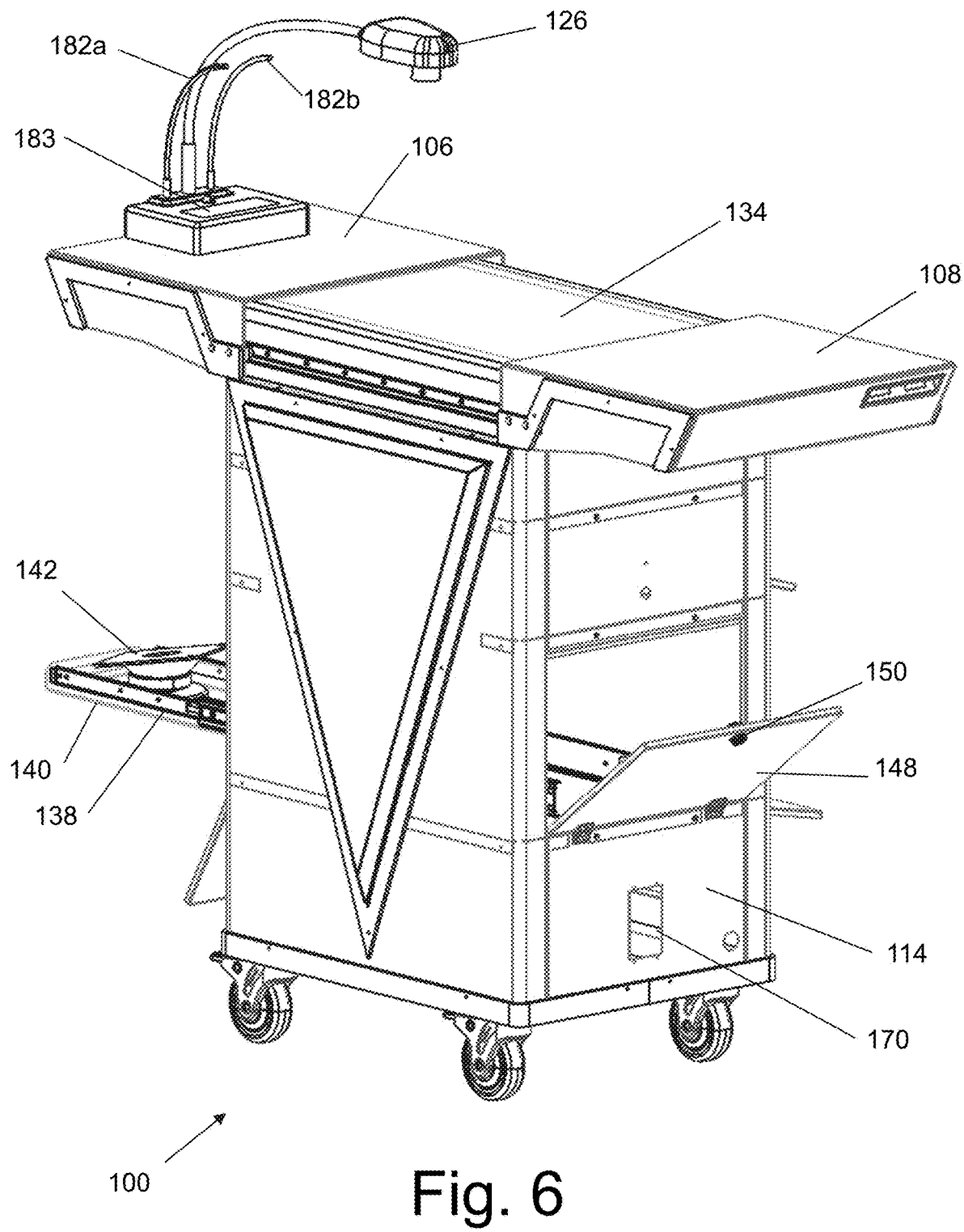
FIG. 6 is a front left isometric view illustrating the educational multimedia station of FIG. 1 in a second or open configuration.
Figure 7:
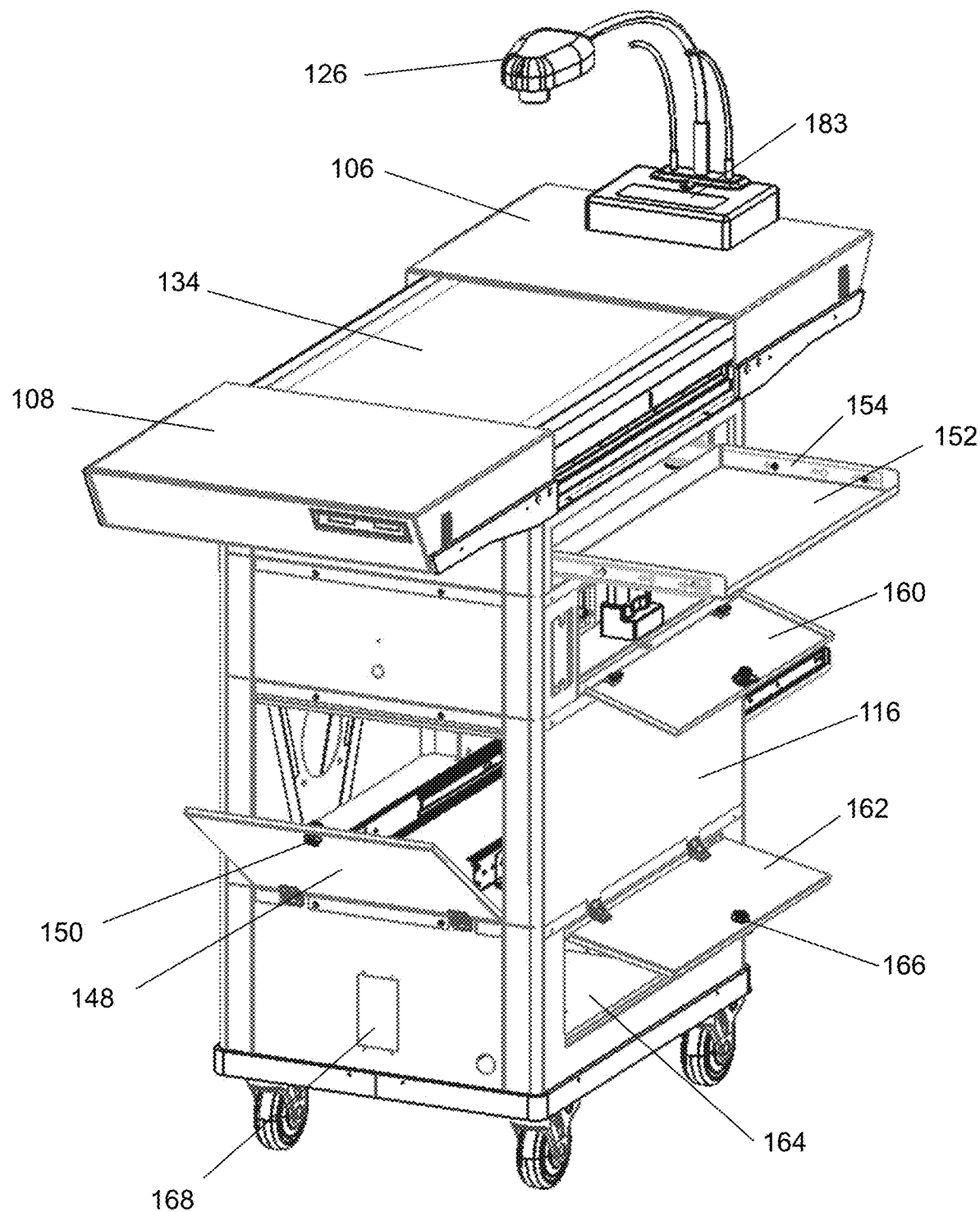
FIG. 7 is a back left isometric view illustrating the educational multimedia station of FIG. 1 in a second or open configuration.
Figure 8:
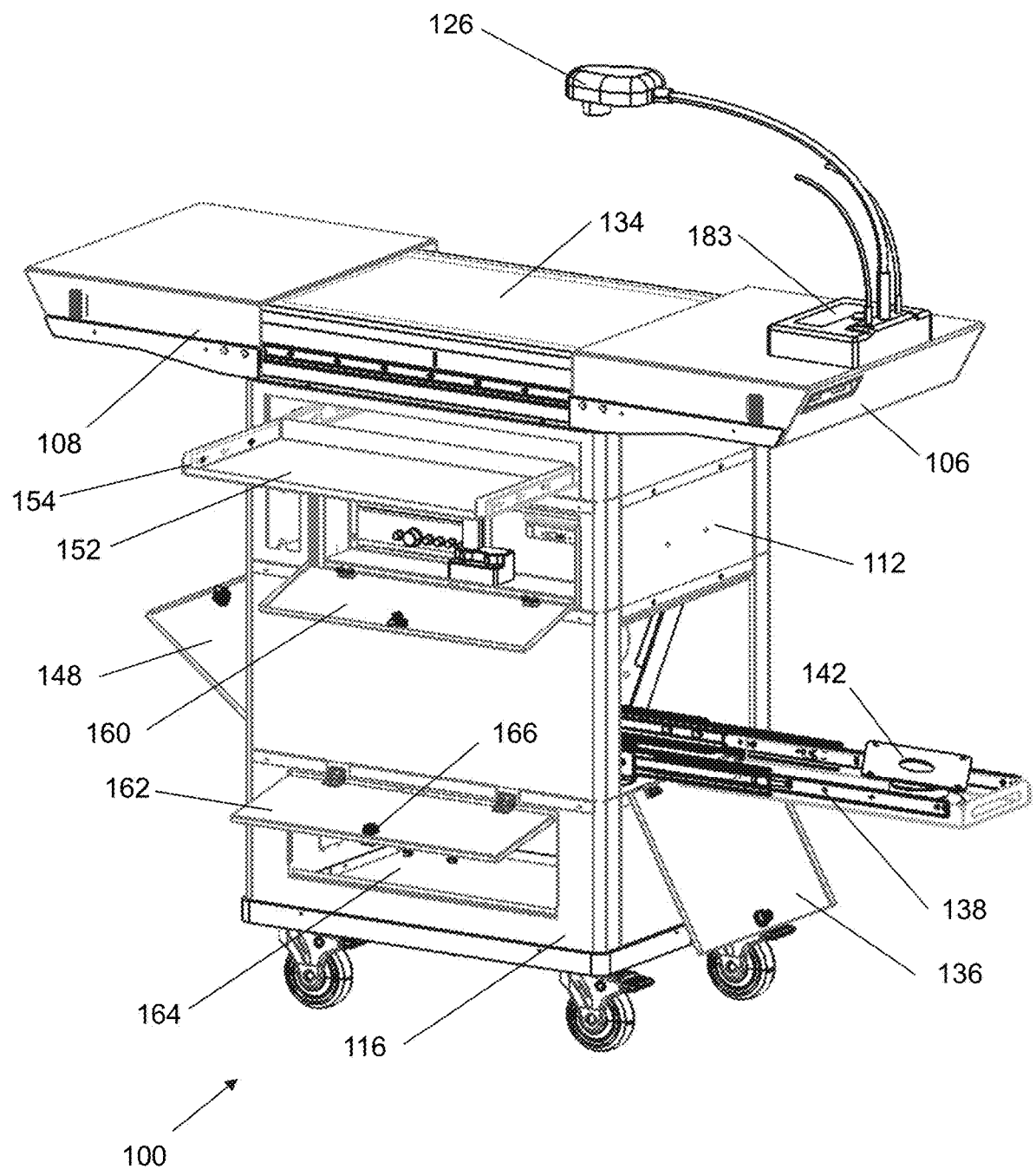
FIG. 8 is a back right isometric view illustrating the educational multimedia station of FIG. 1 in a second or open configuration.
Figure 9:
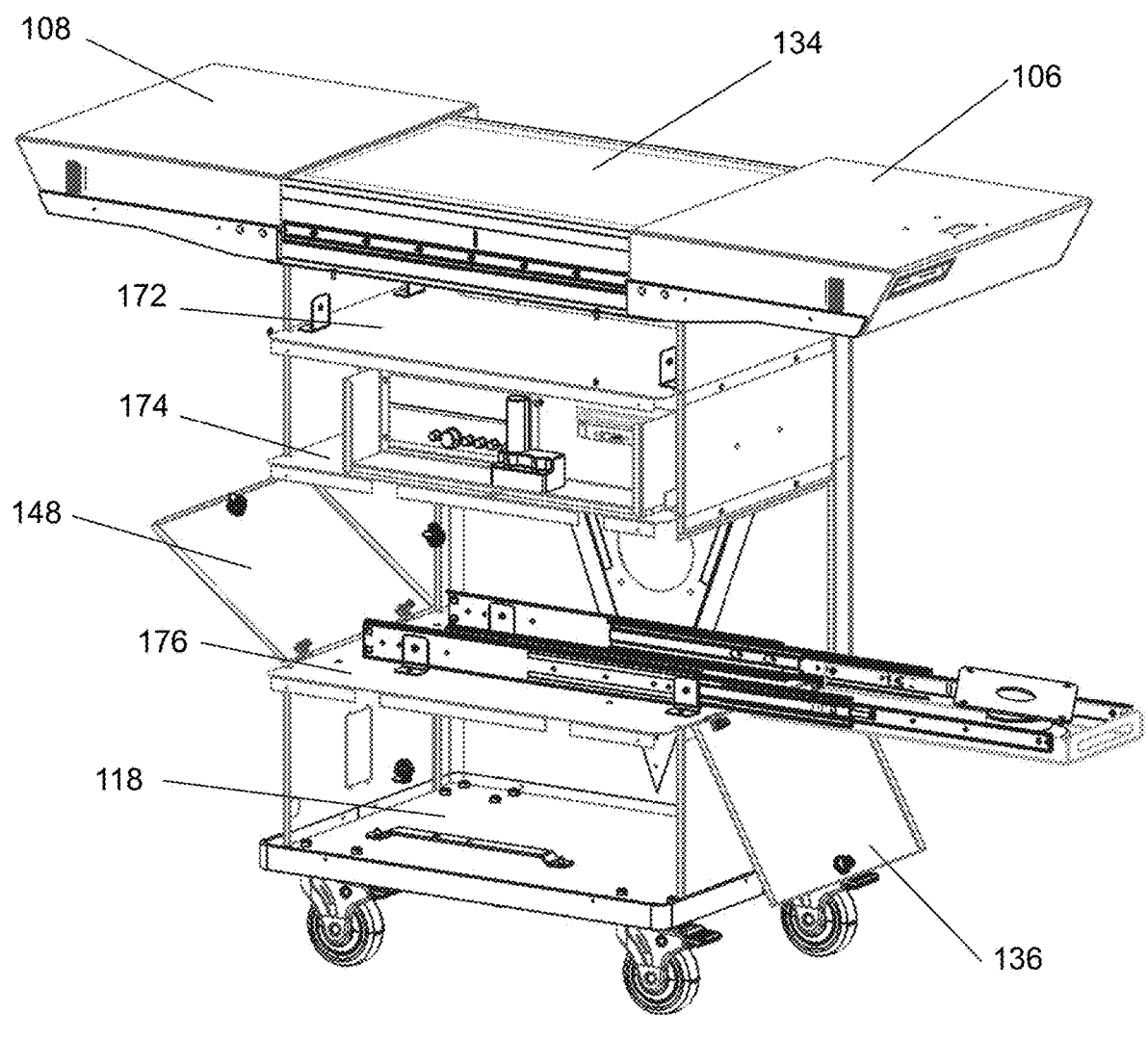
FIG. 9 is a back right isometric view illustrating the educational multimedia station of FIG. 1 in a second or open configuration with certain components removed for clarity.
Figure 10:
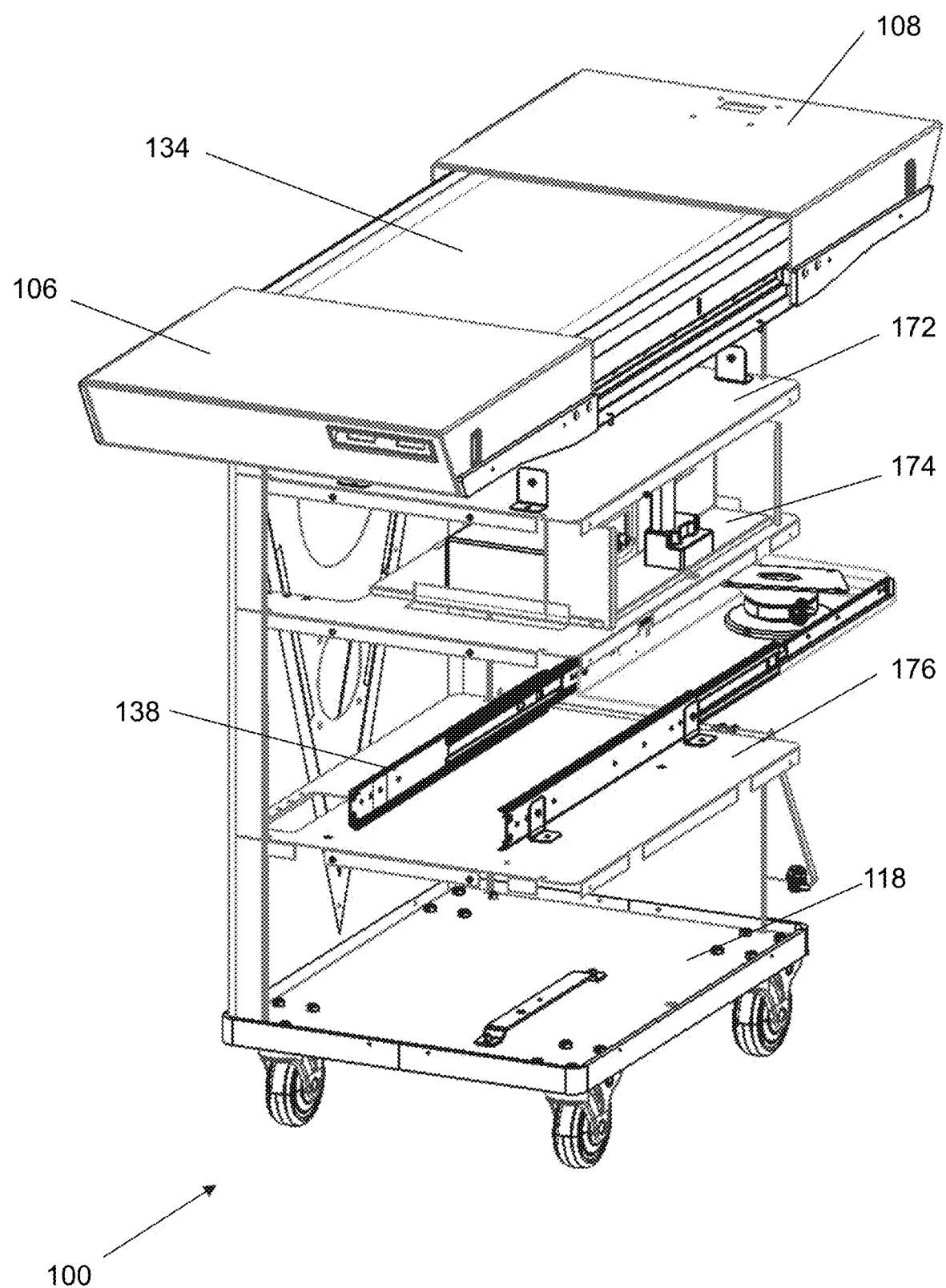
FIG. 10 is a back left isometric view illustrating the educational multimedia station of FIG. 1 in a second or open configuration with certain components removed for clarity.
Figure 11:
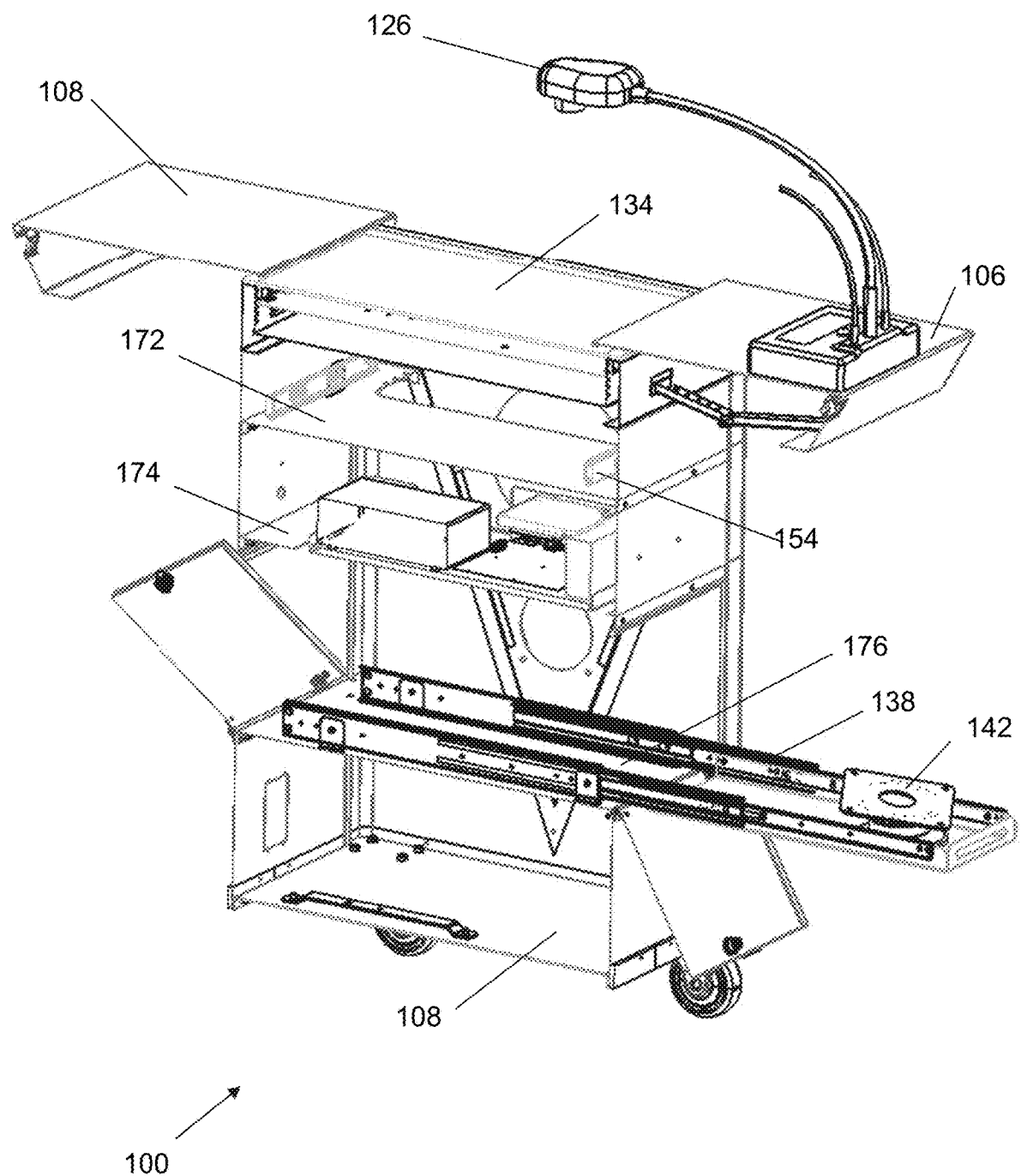
FIG. 11 is a back right isometric sectional view illustrating the educational multimedia station of FIG. 1 in a second or open configuration.

Turning now to FIGS. 5 through 11, there is presented one embodiment of a multimedia station 100 in a second or open configuration. FIG. 5 is a front left isometric view of the multimedia station 100. FIG. 6 is a front right isometric view of the multimedia station 100. FIG. 7 is a back left isometric view illustrating of the multimedia station 100. FIG. 8 is a back right isometric view illustrating one embodiment of the multimedia station 100. FIG. 9 is a back right isometric view illustrating one embodiment of the multimedia station 100 with the back wrapper 116 removed for clarity. FIG. 10 is a back left isometric view illustrating one embodiment of the multimedia station 100 with the back wrapper 116 and the first side wrapper 112 removed for clarity. FIG. 11 is a back right isometric section view illustrating one embodiment of the multimedia station 100 with a portion of the station removed for clarity.

As illustrated in FIGS. 5 through 11, the first slideable tray 106 and the second slideable tray 108 in a closed or first configuration can be slid along a railing system 132 apart from each other to reveal a touch-display 134. The first slideable tray 106 and the second slideable tray 108 are fully apart and the touch display 134 is revealed, the trays are in a second or open configuration. When not in use, the trays may be slid together back to the first configuration and locked to secure the station 100.

As illustrated in FIGS. 5 and 8, in certain embodiments, the first side wrapper 112 may have may have a side door 136 to allow a projector railing system 138 to extend outside the rectangular enclosure 102. The projector railing system 138 may be coupled to a projector support plate 140 and a rotatable projector stand 142. The rotatable projector stand 142 may be coupled to a digital projector 144 (see FIG. 12). The projector stand 142 may be rotatable so that the angle of the projector 144 may be adjusted. Thus, during presentations the digital projector 144 may extend outside of the enclosure 102 to display on a surface typically behind the user of the station 100. As illustrated in FIG. 5., the digital projector extends out through the side door 136. A door locking mechanism 146 is coupled to the side door 136 to secure the projector 144 inside the enclosure 102 when the station is not in use or in a closed position.

Turning now to FIG. 6, as illustrated, the second side wrapper 114 may also have a side door 148 with a door locking mechanism 150. The station 100 may be configured so that the projector railing system 138 may extend the projector out either the side door 136 or the side door 148, depending on the configuration of the classroom or the preferences of the user.

FIGS. 7 and 8 show the back wrapper 116 in an open configuration. As illustrated, there is a keyboard tray 152 coupled to a keyboard railing system 154. The keyboard tray 152 and the keyboard railing system 154 permits a keyboard 156 (not shown) to be pulled out and used as a data input device to a computer 158 (not shown).

Additionally, the back wrapper 116 has a top or component door 160. When the component door 160 is opened as illustrated in FIGS. 7 through 9, it allows access to various internal components of the station 100. Some of the various components, include the computer 158, a main power controller for the station (not shown). The main power controller allows the user to turn on all of the station 100's powered components at the touch of one button. Some of the powered components include the computer 158, the projector 144, the touch display 134 and a wireless router (not shown).

In certain embodiments, the back wrapper 116 may also have a back door 162 to access a storage area 164. For example, the storage area 164 may store a retractable power cord system which allows a user to pull the power out of side opening 168 (FIG. 7) or side opening 170 (FIG. 6). In certain embodiments, the back door 162 may have a locking mechanism 166.

FIG. 9 is a back right isometric view illustrating the station 100 in a second or open configuration with the back wrapper 116 and the doors 160 and 162 removed for clarity. FIG. 10 is a back left isometric view illustrating the station 100 in a second or open configuration with the back wrapper 116, the side wrapper 114, and certain components removed for clarity. FIG. 11 is a back right isometric sectional view illustrating the station 100 in a second or open configuration.

As illustrated in FIG. 10 through 11, in certain embodiments there may be a plurality of shelves to structurally support the various components of the station 100. As an example, the shelf 172 supports the keyboard railing system 154. The shelf 174 may support various electrical components of the station 100. The shelf 176 supports the projector railing system 138.

Figure 12:
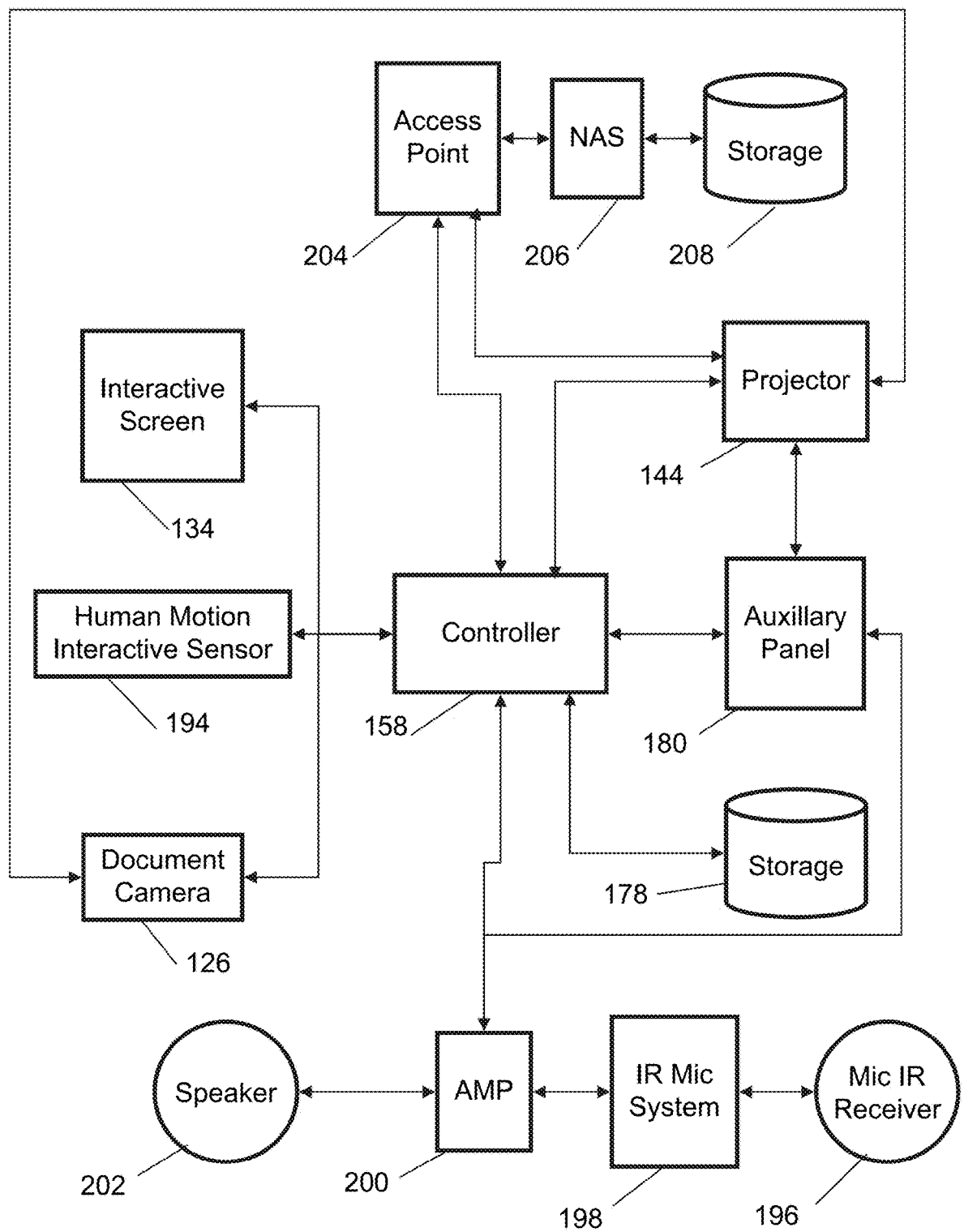
FIG. 12 illustrates a block diagram representing one embodiment of the major electrical components of the multimedia station of FIG. 1.

Turning now to FIG. 12, there is presented a block diagram representing one embodiment of the major electrical components of the system 100. As discussed above, there is the computer 158 which acts a controller for the station 100. In certain embodiments, the computer 158 may include a third generation i5 Intel processor in communication with 4 GB of memory and a storage device 178. In certain embodiments, the storage device 178 may be a Solid State Drive ("SSD"). Typically, a solid state drive is more durable than a standard hard drive. Because the station 100 is portable, it is likely that it will be moved and bumped into objects which may damage a standard drive.

In certain embodiments, the computer may be in communication with an auxiliary panel 180. In certain embodiments, the auxiliary panel 180 may contain a variety of I/O devices, such as USB ports; a CD/DVD/Blue Ray player/recorder; a VGA input port for connecting with external notebooks; a wired network connection, such as a RJ45 network connection; and a 3.5 mm audio jack (or any equivalent of such components thereof now known or known in the future).

As previously discussed, the station 100 may be include a document camera 126. In certain embodiments, the document camera 126 may have WXGA (1280×800) output resolution. In certain embodiments, the document camera may be autofocus, have photo and video capture to a USB or internal storage device. In certain embodiments, the document camera may have its own controller, memory and control software (such as Ladybug control software). In yet other embodiments, the camera may have a microscope option. In some embodiments, there may be one or more side arms such as 182*a* and 182*b* (FIG. 6), having lights at their ends to illuminate the documents or an object of interest. In certain embodiments, a control panel 183 may be located at the base of the lights. In certain embodiments, the control panel may be used to control the camera (e.g., focus or zoom the camera and take pictures of the documents and objects). In certain embodiments, the camera may have a macro lens which will allow the camera to display and take pictures of objects at an extremely close distance. Because the camera may be positioned on a flexible arm, the camera's position from the documents can be easily moved closer or further away—depending on the camera's subject.

In certain embodiments, the touch display 134 is a six layer 10 point multi-touch screen which allows a wide viewing angle, such as a 178 degree viewing angle. This wide angle allows the user to see the display when the user is in the proximity of the station 100. It also allows small groups of viewers to see and interact with the station 100.

Figure 13:
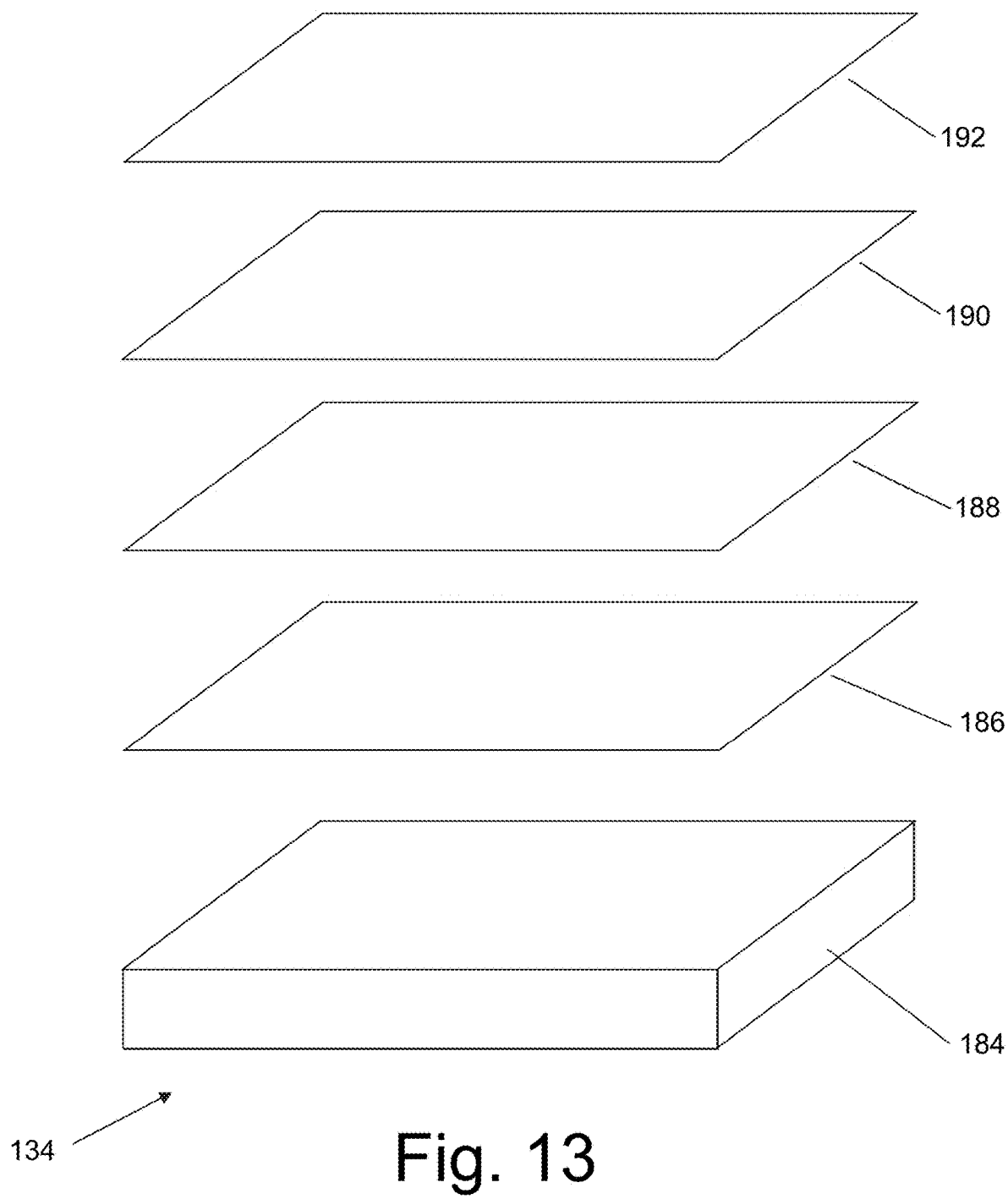
FIG. 13 is a conceptual illustration of one embodiment of a interactive display which may be used in the multimedia station of FIG. 1.

Turning now to FIG. 13, there is a conceptual illustration of the touch display 134. In certain embodiments, the display 134 is enclosed in a housing 184. Within the housing 184, there is a first layer 186. In certain embodiments, the first layer 186 may be a LCD panel with a 178 degree viewing angle so that the panel may viewed users at greater distances. In some embodiments, there may be a 10 point transparent sensor layer or substrate 188 placed over the LCD layer 186. Additionally, in some embodiments, there may be an antiglare material or substrate 190 placed over the sensor layer 188. In certain embodiments, the antiglare substrate 190 may be important because the touch display 134 will be positioned up and may be directly opposed to classroom overhead lights facing down which is likely to cause harsh reflections without an anti-glare material. Finally, in certain embodiments, the display is protected with a protective coating 192, such as an alkali-aluminosilicate sheet or Gorilla Glass® by Corning. Thus, the display 134 is protected by impact resistant non-glare glass system. This provides durability in a potentially harsh environment (e.g., students banging on the display).

Turning back to FIG. 12, the controller or computer 158 is also in communication with a human motion interactive sensor 194.

In one embodiment, the Human Motion Interactive Sensor 194 may include a capture device. The capture device may be, for example, a camera that may be used to visually monitor one or more users, such that gestures performed by the one or more users may be captured, analyzed, and tracked to partially control the station 100. For example, rather than use a mouse to advance a PowerPoint presentation slide, the user could simply swipe his or her hand. When running an application program such as PowerPoint, this motion would be captured by the capture device and interpreted to mean advance the slide show to another slide.

In yet other embodiments, software process running on the computer 158 may be able to identify a human user via the human motion interactive sensor 194, and/or the document camera or another camera coupled to the station 100. There are several forms of facial recognition software and processes known in other fields of art. Such programs could be implemented with the computer 158 upon startup. In this manner, the identity of the user may be confirmed with school records. In yet other embodiments, less sophisticated software may be used to identify the approximate height, weight and/or race of the user. In such embodiments, these identifying factors may be used to verify that the operator is a teacher or part of the school staff (as opposed to an unauthorized student or user.)

Other movements by the user may also be interpreted as other controls or actions, such as controls to stop playing, advance, rewind, or play—depending on the application.

In example embodiments, the user may have an object such as a microphone or laser pointer. In such embodiments, the user may be holding the object such that the motions of the user and the object may be used to adjust and/or control parameters of the application program.

In certain example embodiments, the capture device may be configured to capture video with depth information including a depth image that may include depth values via any suitable technique including, for example, time-of-flight, structured light, stereo image, or the like. According to one embodiment, the capture device may organize the calculated depth information into "Z layers," or layers that may be perpendicular to a Z axis extending from the depth camera along its line of sight.

In such embodiments, the capture device may include an image camera component (not shown). According to an example embodiment, the image camera component may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

According to one example embodiment, the image camera component may include an IR light component, a three-dimensional (3-D) camera, and an RGB camera that may be used to capture the depth image of a scene. For example, when the user moves, the IR light component of the capture device may emit an infrared light onto the scene and may then use sensors (not shown) to detect the backscattered light from the surface of one or more targets and objects in the scene using, for example, the 3-D camera and/or the RGB camera.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device to a particular location on the targets or objects by analyzing the intensity of the reflected beam of light over time via various techniques including, for example, shuttered light pulse imaging.

In another example embodiment, the capture device may use a structured light to capture depth information. In such an analysis, patterned light (i.e., light displayed as a known pattern such as grid pattern or a stripe pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera and may then be analyzed to determine a physical distance from the capture device to a particular location of the user or object.

According to yet another embodiment, the capture device may include two or more physically separated cameras that may view a scene from different angles, to obtain visual stereo data that may be resolved to generate depth information.

The capture device may further include a microphone (not shown). The microphone may include a transducer or sensor that may receive and convert sound into an electrical signal. According to one embodiment, the microphone may be used to reduce feedback between the capture device and the computing environment in the target recognition, analysis, and tracking system.

Additionally, the microphone may be used to receive audio signals that may also be provided by the user to control applications such as applications running on the computer 158.

In other embodiments, there may be a handheld or clip on microphone and transmitter, such as an infrared or IR transmitter. Such a microphone transmitter may be rechargeable through an interface positioned within the station 100. In such embodiments, there may be an IR receiver 196 which may be in electronic communication with an IR Mic System 198. In certain embodiments, the IR Mic System 198 may be in communication with an amplifier 200, which amplifies signals coming from the IR Mic System 198 or the computer 158 in order to drive a speaker 202. For instance, in some embodiments, the amplifier 200 may produce two channels of 125 watts of output to an 8" full range speaker. The amplifier 200 may have a full range of tone controls and mixed inputs such as a mic in and line in ports.

In yet other embodiments, the IR Mic System 198 may be in communication with the computer 158 and may supply voice input signals which may be recognize by software running on the computer 158 to control various applications programs or the station 100. For example, the user could say "stop" to stop a prerecorded presentation. Other common controls, such as "rewind," "forward," or "fast forward" could also be used to control the presentation.

In certain embodiments, the computer 158 may have a voice recognition system which would not only record what the user says, but could interpret the user's voice and could type what was said as text on the interactive screen 134 and the projector 144 as the user speaks. As will be explained later, such text information could also be sent to the devices used by the students which would eliminate the need for detailed note taking.

In certain embodiments, the projector 144 may be a short throw DLP and may throw a 95"diag picture as close as 3.25 ft. Such a projector may be capable of producing 2500 ANSI Lumens of light at a native resolution of WXGA (1280×800) resolution via a 220 w Lamp (4500 to 6000 hrs). In certain embodiments, the projector may accept input from a port on the auxiliary panel 180, from the computer 158 or from a wireless access point 204. Thus, the projector 144 may connect wirelessly and wired. In certain embodiments, the projector 144 may accept USB input. However, as far as the computer 158 is concerned, the projector 144 is simply another monitor.

As discussed above, the computer 158 with the facility's or enterprise's network via wired or wireless communications. For wired communication, there may be a RJ45 network connection for instance, on the auxiliary panel 180. For wireless communication, the wireless access point 204 may communicate with the enterprise's wireless network.

In certain embodiments, the wireless access point 204 may be in communication with a local network access device 206 which includes one or more storage devices 208, such as a SSD.

Figure 14:
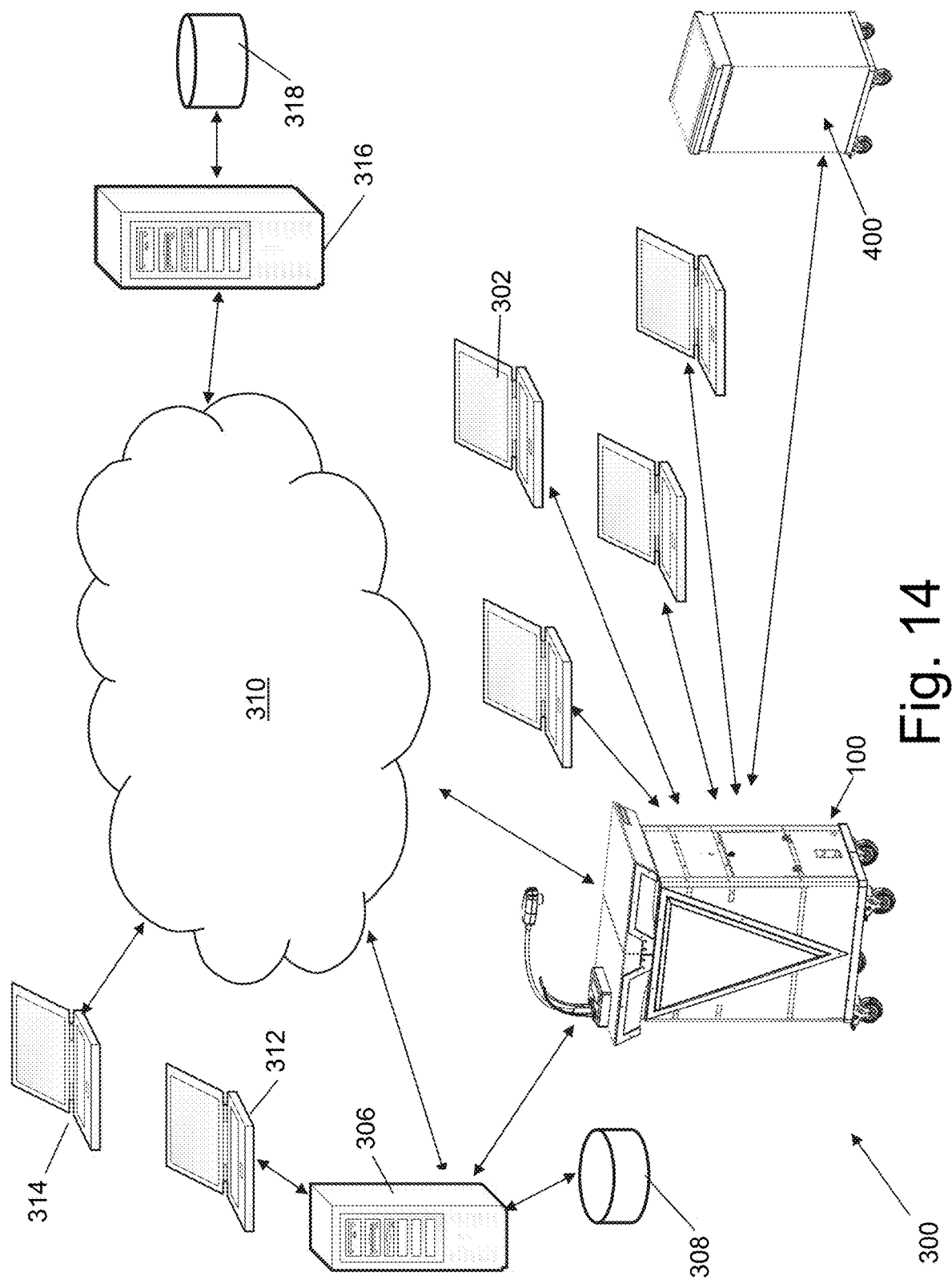
FIG. 14 is a conceptual illustration of a system which may incorporate the multimedia station of FIG. 1.

In certain embodiments, the wireless access point 204 serves a dual function: (1) it communicates wireless with the enterprise's wireless network, and (2) it may create a local network for the classroom. To illustrate, turn to FIG. 14 which is a conceptual view of the station 100 as part of an integrated classroom system 300.

The integrated classroom system 300 includes a plurality of computing devices 302, such as notebook computers, tablet computers, or even smart phones. The plurality of computers may connect to the wireless access device 204 (FIG. 12) which forms a local wireless network which may be separate from the facility's or enterprise network.

By providing a separate local network, the station 100 can allow the plurality of computing devices 302 to interact and share resources of the station 100, for instance the NAS 206. In certain embodiments, the computing devices can access the station's local network relatively easily (via the station's network name and password). In contrast, if the computing devices 302 were to access the facility's or enterprise network, the student would often only have limited access, such as Internet access. (Because of security concerns, most facilities do not let the students have access to the resources of their network—this limits the amount of interaction that can be performed between the facilities network and the student's computer.)

In certain embodiments, software can be executed on the plurality of computers 302 which can allow the station 100 to can take control of the individual computers. For instance, if a student solves a problem on one of the computers 302, the teacher can project the work to the rest of the class via the projector 144. In other embodiments, students can take tests interactively on the computers 302 and the test scores computed and tallied immediately.

Many school systems now encourage students to bring their own computing devices 302 conceptually known as "Bring your own Technology." The station 100 can connect to a variety of devices. Consequently, the system 300 addresses the digital divide or the technology difference between rich and poorer students. The less well off students can be connected with a relatively cheap computing device, but still have and interact with the same content as a student with a much more expensive computing device.

One or more interactive multi-user devices or stations 400, such as an interactive table, may also connect to the station 100 via one or more wireless links. The multi-user device 400 allows students to interact and solve problems in groups because it allows interaction with multiple users. The interactive table or station may enclose a computer, with a touch screen interface on the top of the table. Thus, groups of students may gather around the interactive table for group collaboration. In certain embodiments, the interactive table may have an enclosure similar to the station 100 in that lockable protection, power, storage space, etc. may be used.

As previously discussed, the station 100 can communicate either wired or wireless with the enterprise network 306. The enterprise network or server 306 may have its own storage devices 308 as are typically known in the art. The enterprise network 306 is in communication with a public network 310 such as the Internet via standard communication links. A variety of enterprise computing devices, such as a personal computer 312 for a school administrator can communicate the enterprise network or server 306.

A parent's computing device, such as notebook computer 314 may communicate the enterprises server 306 via the public network 310 as is typically known in the art. Additionally, a privately owned web server 316 coupled with a storage device 318 may communicate with the enterprise server(s) 306 via the publically accessible network 310.

In certain embodiments, the interactive touch display 134 and microphone system 198 (FIG. 12) can also be used as an input recording device. For instance, a teacher could use the touch display has a virtual whiteboard or chalkboard and write equations directly on the board either by touching, with the help of a stylus, or keyboard. Simultaneously, the teacher can also speak to the class. The microphones of the station 100 will pick up the teacher's voice and at the same time, the computer 158 will record the input presented on the screen. Thus, an audio/visual recording can be simultaneous stored on the storage device 178 of the station 100. When completed, the AV recording can be uploaded to the enterprises storage device 308 or a publically available storage device 318.

Thus, the station 100 allows teachers to be able to record their lessons and make them available to students on a local storage 206, an enterprise storage 308, or a cloud or publically available storage 318. This system 300 enables students to learn the lessons on demand by watching pre-recorded lessons from their teacher. Within this concept of learning, students may be doing "homework" in school while teachers can help answer their questions.

The AV recording features of the station 100 allows for a quick and easy way for the teacher to start recording their lessons for future usage without having the need for any additional equipment. The station 100 may capture all of the screen pages and annotation in a video file that can be posted on a publically available storage device, whether a private cloud storage 318, YouTube, Facebook, Twitter, Moodle, Blackboard or the school's private cloud via the storage device 308. In certain embodiments, teachers may have the option to post the AV recording or keep it private on the NAS 206.

Thus, the class lesson can be automatically saved. This is helpful for students who were absent the day of the lecture or for other students who simply want to go back and review the presentation. Principles (via computer 312) and even parents (via computer 314) may also have access to the recorded lectures stored on the storage device 308 or the storage device 318—which allow them to evaluate the teacher's presentation and teaching skills. Thus, the system 300 may bring the teacher, students, parents, and administrator together and allow them to watch the lessons and lectures. The principal can watch the lesson plans to evaluate the teacher. When the teacher knows that the parents can see the lectures, the chances of inappropriate or abusive behavior is minimized.

Additionally, the school may allow all recordings on a particular subject to be made available. So, that if one student did not understand a particular lesson provided by one teacher, the student could access another teacher's recording of the same subject matter. Such a system 300 could also be paired with analytics software to evaluate which lessons are more effective and thus which teacher's are more effective. Such evaluations would not only be helpful at identifying good teachers, but could also assist in the development of a curriculum for the school system.

Finally, some students may not need any live instruction, but may be able to learn from the recorded lessons. The teachers would be able to just monitor their performance. Other students may require more face to face instruction from the teacher. Thus, the system 300 allows the teacher to apply and focus their resources to the students on an individual basis depending on the student's ability or motivation to learn. Thus, the teacher can then focus their energies on students who need the extra attention.

Figure 15:
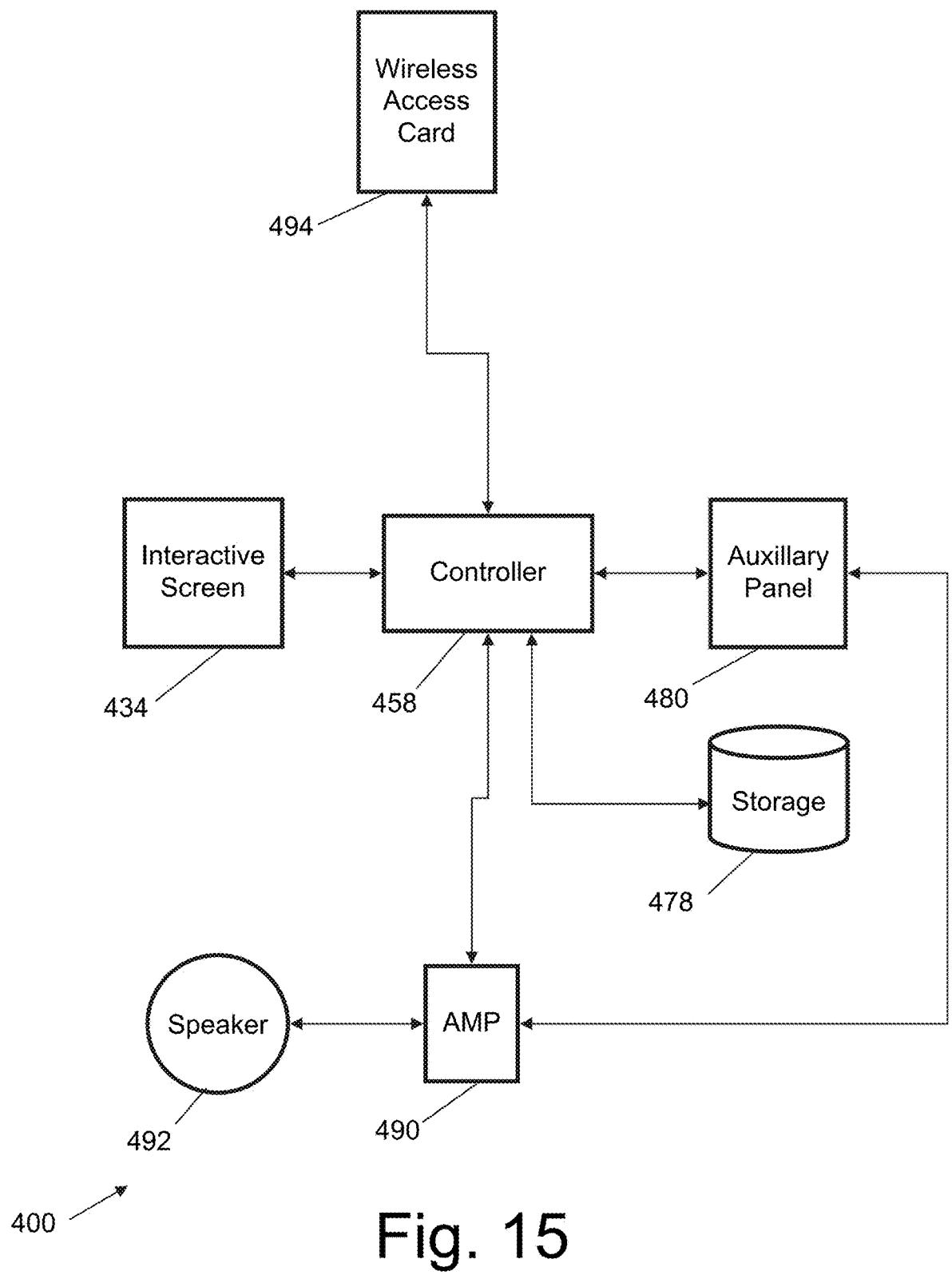
FIG. 15 illustrates a block diagram representing one embodiment of the major electrical components of an alternative station which may be used in conjunction with the multimedia station of FIG. 1 in the system illustrated in FIG. 14.

Turning now to FIG. 15, there is presented a block diagram representing one embodiment of the major electrical components of the interactive multi-user device 400. Similar to the station 100, there may be a computer 458 which acts a controller for the multi-user device 400. In certain embodiments, the computer 458 may include a third generation i5 Intel processor in communication with 4 GB of memory and a storage device 178. In certain embodiments, the storage device 478 may be a Solid State Drive ("SSD"). A solid state drive is more durable than a standard hard drive. Because the multi-user device 400 is portable, it is likely that it will be moved and bumped into objects which may damage a standard drive.

In certain embodiments, the computer 458 may be in communication with an auxiliary panel 480. In certain embodiments, the auxiliary panel 480 may contain a variety of I/O devices, such as USB ports; a CD/DVD/Blue Ray player/recorder; a VGA input port for connecting with external notebooks; a wired network connection, such as a RJ45 network connection; and a 3.5 mm audio jack (or any equivalent thereof now known or known in the future).

In certain embodiments, the multi-user device 400 may include a touch display 434 which may have a four layer 10 point multi-touch screen which allows a wide viewing angle, such as a 178 degree viewing angle (similar to the display 134 of the station 100). This wide angle allows several users or students to see the display 434 and interact with the multi-user device 400 when the users are in the proximity of the device.

Alternatively, in some embodiments, the controller or computer 458 may be also in communication with a human motion interactive sensor (not shown) which is similar to the interactive sensor 194 discussed above in reference to FIG. 12.

In certain embodiments, the computer 458 may be in communication with an amplifier 490, which amplifies signals coming from the computer 458 in order to drive a speaker 492. For instance, in some embodiments, the amplifier 490 may produce two channels of 125 watts of output to an 8" full range speaker. The amplifier 490 may have a full range of tone controls and mixed inputs such as a mic in and line in ports.

In certain embodiments, there may be a wireless access card or device 494 coupled to the computer 458. Thus, allowing the computer 458 to communicate with the station 100, or the facility's or enterprise's network via wireless communications. In certain embodiments, there may be a RJ45 network connection (not shown) for instance, on the auxiliary panel 480 for allowing the multi-user station 400 to communicate with the station 100 or the enterprise network via a network cable.

In certain embodiments, the wireless access point 484 serves a dual function: (1) it communicates wireless with the station 100, or (2) it may communicate with the enterprise's wireless network.

In certain embodiments, the multi-user device 400 may store application software on the storage device 478. In other embodiments, the multi-user device 400 may receive signals from the station 100. The degree of integration depends on the configuration of the system 300.

Figure 16A:
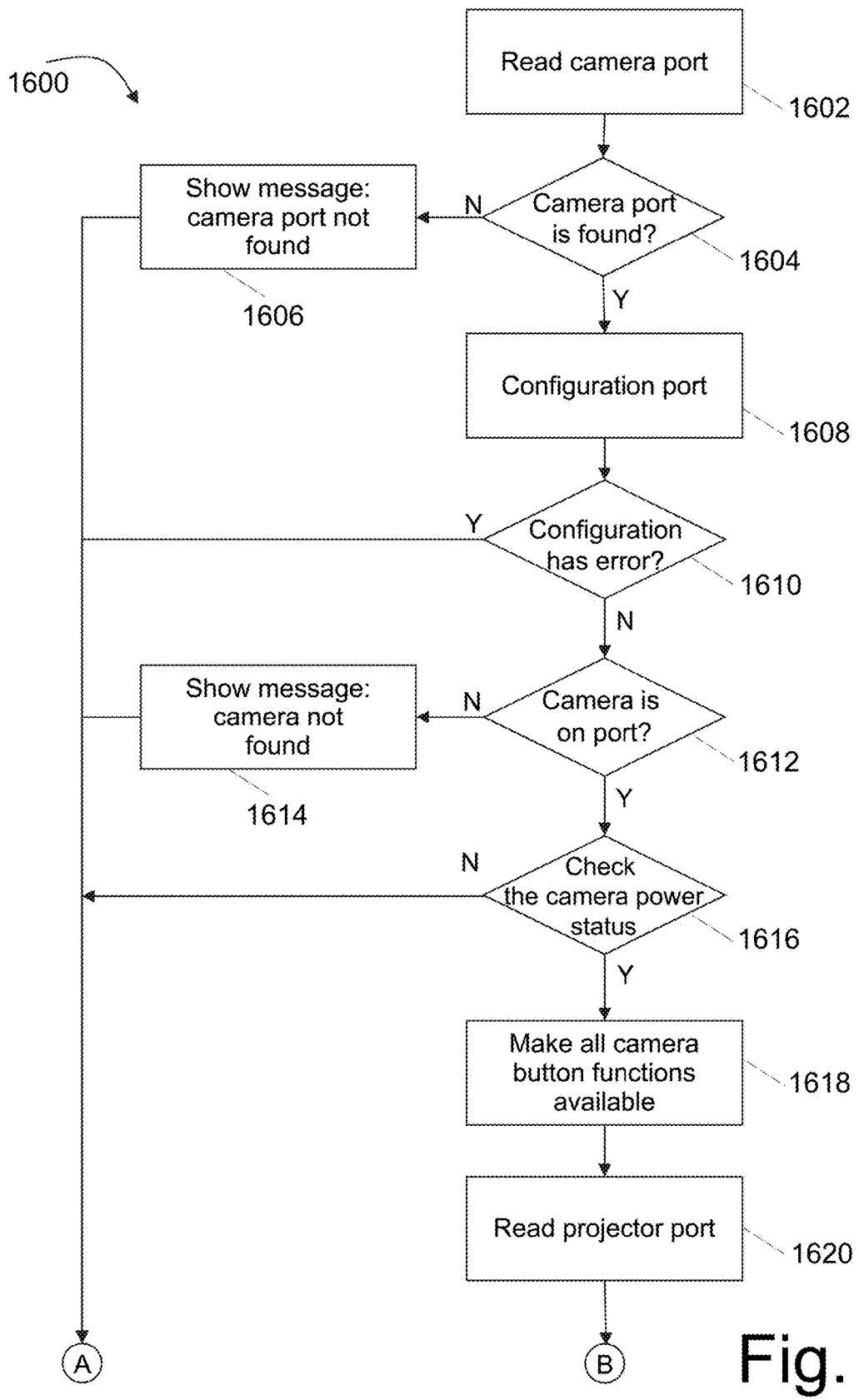
FIGS. 16A and 16B are flowcharts illustrating of an application start process for one embodiment of the multimedia station of FIG. 1.
Figure 16B:
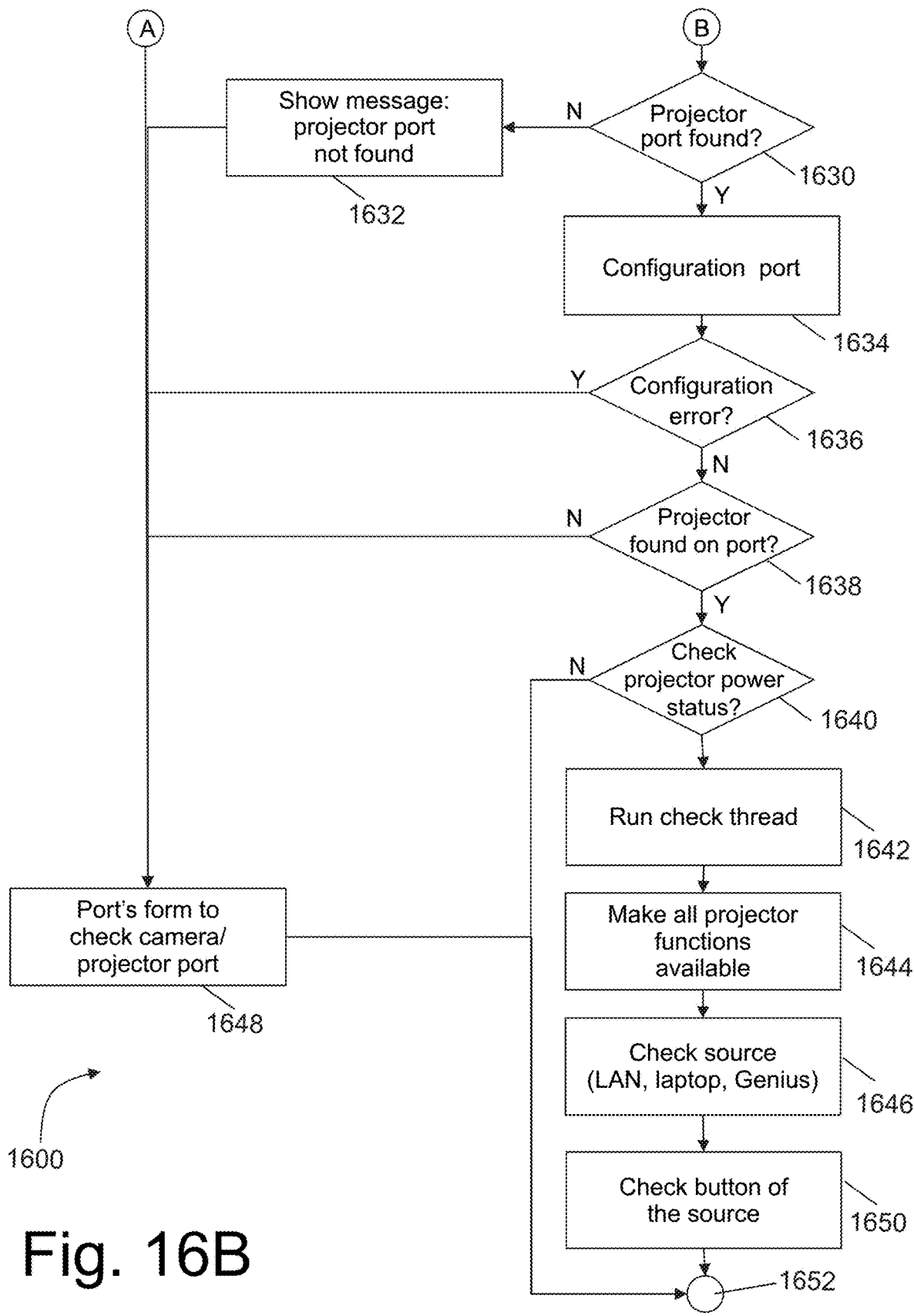

FIGS. 16A and 16B are flowcharts illustrating an application start process 1600 for an embodiment of the present invention. The sub-process 1600 begins by reading a camera port in step 1602. In step 1604, the process determines if a camera port is found. If the camera port is found, the process flows to step 1608. If not, the process flows to step 1606 where a message or indicator is shown to the user indicating that the camera port is not found. The process then flows to step 1648 (via connection point "A" of the flowcharts).

In step 1608, the port is configured. The process then flows to step 1610 where a check is performed to see if there is a configuration error. If there is a configuration error, the process flows to step 1648 (via the connection point "A" of the flowcharts). If not, the process flows to step 1612.

In step 1612, a check is performed to determine if there is a working camera on port. If there is a camera on port, the process flows to step 1616. If not, the process flows to step 1614 where an indicator or a message is shown stating "camera port not found" and the process moves to step 1648 (via connection point "A" of the flowcharts).

At step 1616, a check is performed to determine if the camera has power. If yes, the process flows to step 1618. If no, the process flows to step 1648 (via the connection point "A" of the flowcharts.)

At step 1618, all of the camera button functions are then made available to the user and the process flows to step 1620.

In step 1620, the projector port is read. The process then moves to step 1630 (via the connection point "B" of the flow charts.

In step 1630, the process determines if a projection port is found. If the projection port is found, the process flows to step 1634. If not, the process flows to step 1632 where a message or indicator is shown to the user indicating that the projection port is not found. The process then flows to step 1648.

In step 1634, the projection port is configured. The process then flows to step 1636 where a check is performed to see if there is a configuration error. If there is a configuration error, the process flows to step 1648. If not, the process flows to step 1638.

In step 1638, a check is performed to determine if there is a projector is found on a port. If there is a projector on port, the process flows to step 1640. If not, the process flows to step 1648 or the process could flow to an intermediate step (not shown) where an indicator or a message is shown stating "projection port not found" and then the process moves to step 1648.

At step 1640, a check is performed to determine if the projector has power. If yes, the process flows to step 1642. If no, the process flows to a sub-process end point 1652.

At step 1642, a run check thread is processed. After this, in step 1644, all of the projector functions are then made available to the system (and user) and the process flows to step 1646.

After the camera port is found and the camera enabled and the projector port is found and the projector enabled, then the process checks its source, which could be LAN, laptop, or Genius (step 1646), which then indicates a button of the source on the device to be checked (step 1650). The sub-process 1600 then ends at the end point 1652.

Figure 17:
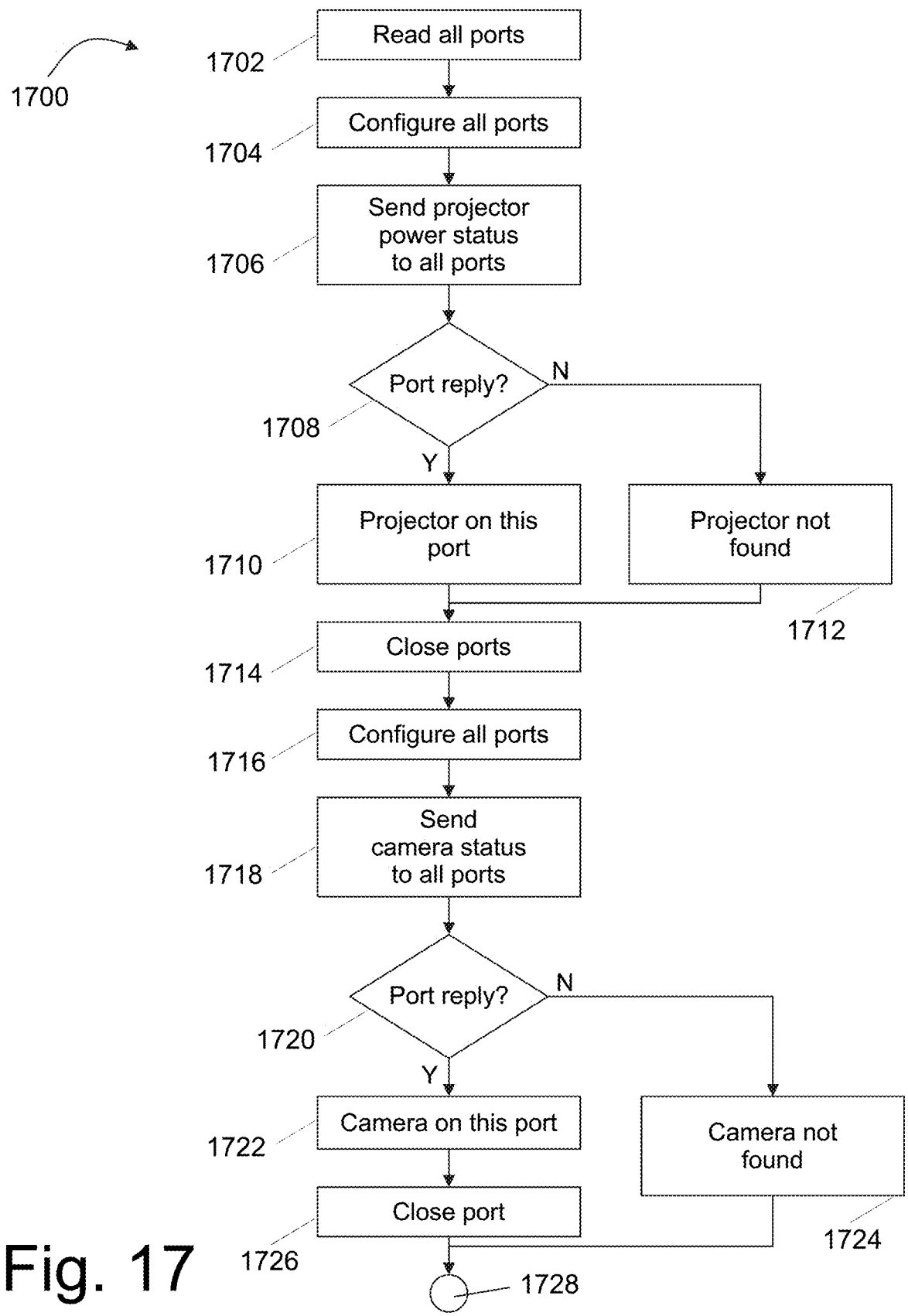
FIG. 17 is a flowchart illustrating a port form start process for one embodiment of the multimedia station of FIG. 1.

When troubleshooting client or server side application network connectivity issues, it is often necessary to determine if access to a certain port that the application uses is being blocked or the various devices are actually on. Turning now to FIG. 17, there is illustrated a flowchart describing a port form start sub-process 1700 for an embodiment of the present invention.

The process 1700 begins by reading all ports in step 1702. Then the process flows to step 1704 where all ports are configured. In step 1706 the projector power status is sent to all ports. The process then waits for replies from the various ports. If there is a reply received, the process flows to step 1710. If not the process flows to step 1712 where a determination is made that the projector is not found. The process then flows to step 1714.

In step 1710, a determination is made that the projector is on the port that sent the reply, the process then moves to step 1714 where all ports are closed.

Then, the process flows to step 1716 where all ports are configured. In step 1718 the camera power status is sent to all ports. The process then waits for replies from the various ports. If a reply is received, the process flows to step 1722. If not, the process flows to step 1724 where a determination is made that the camera is not found and the sub-process flows to the end point 1728.

In step 1722, a determination is made that the camera is on the port that sent the reply, the process then moves to step 1726 where all ports are closed. The sub-process 1700 ends at end point 1728.

Figure 18:
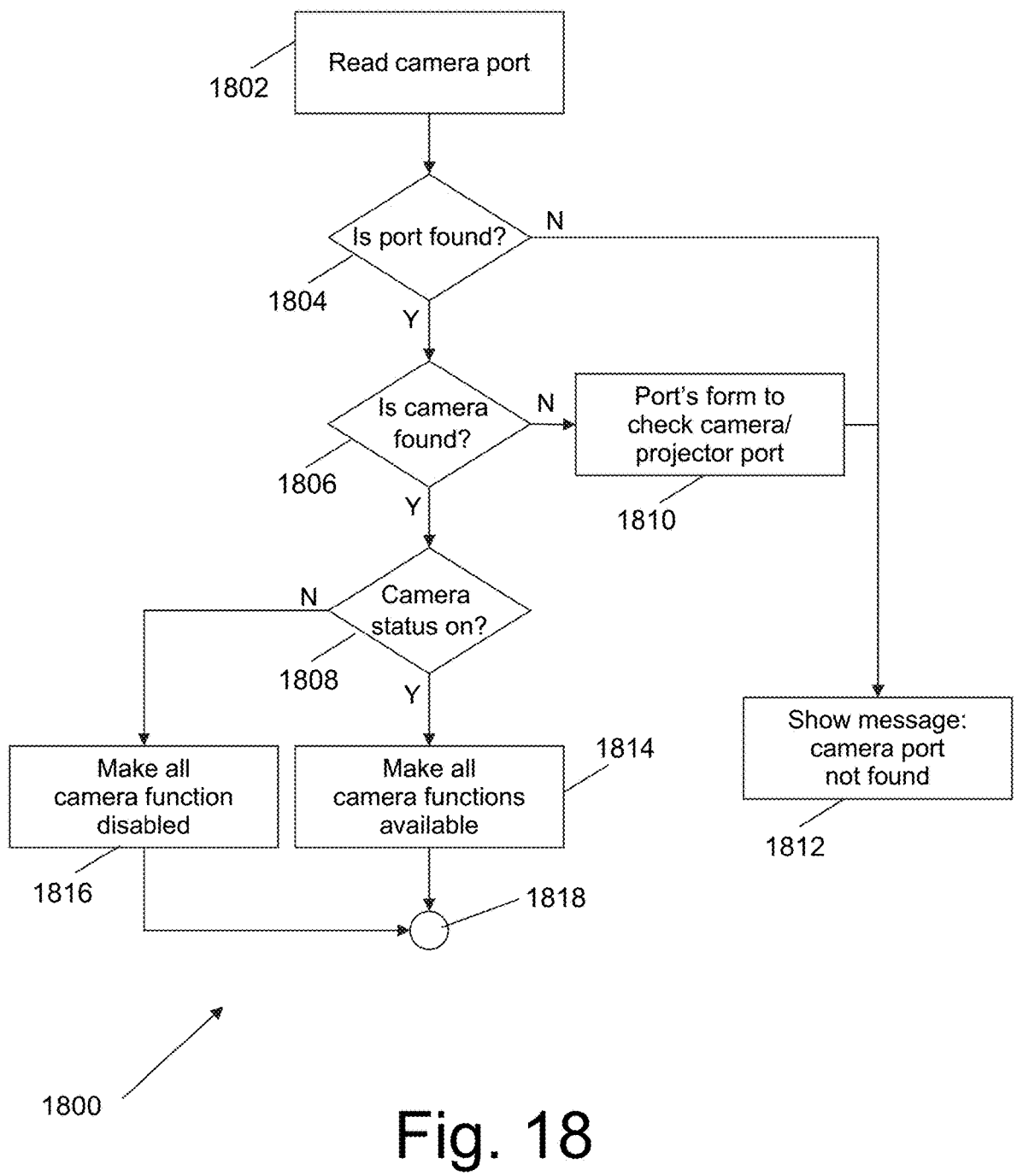
FIG. 18 is a flowchart illustrating a camera on/off process for one embodiment of the multimedia station of FIG. 1.

FIG. 18 is a flowchart illustrating a sub-process 1800 for determining the status of a camera (such as the document camera) and enabling all functions. The process 1800 begins at step 1802 by reading the camera port. The process then flows to step 1804 to determine if the camera port is found. If the camera is found, the process flows to step 1806. If the port is not found, the process flows to step 1812 where the message "Camera Port Not found" is indicated or displayed to the user. The user can try to correct the situation and the process may start again.

In step 1806, a check is performed to determine if the camera is found. If the camera is found, the process flows to step 1808. If not, the process flows to step 1810 where the process checks the camera and projection port. The process then flows to step 1812 (described above).

In step 1808, the camera's status is checked. If the camera is on, the process flows to step 1814. If not the process flows to step 1816 where all camera functions are disabled for the system and the user. The process then flows to an end point 1818.

In step 1814, all camera functions are made available. The process then flows to the end point 1818 where the sub-process 1800 ends.

Figure 19:
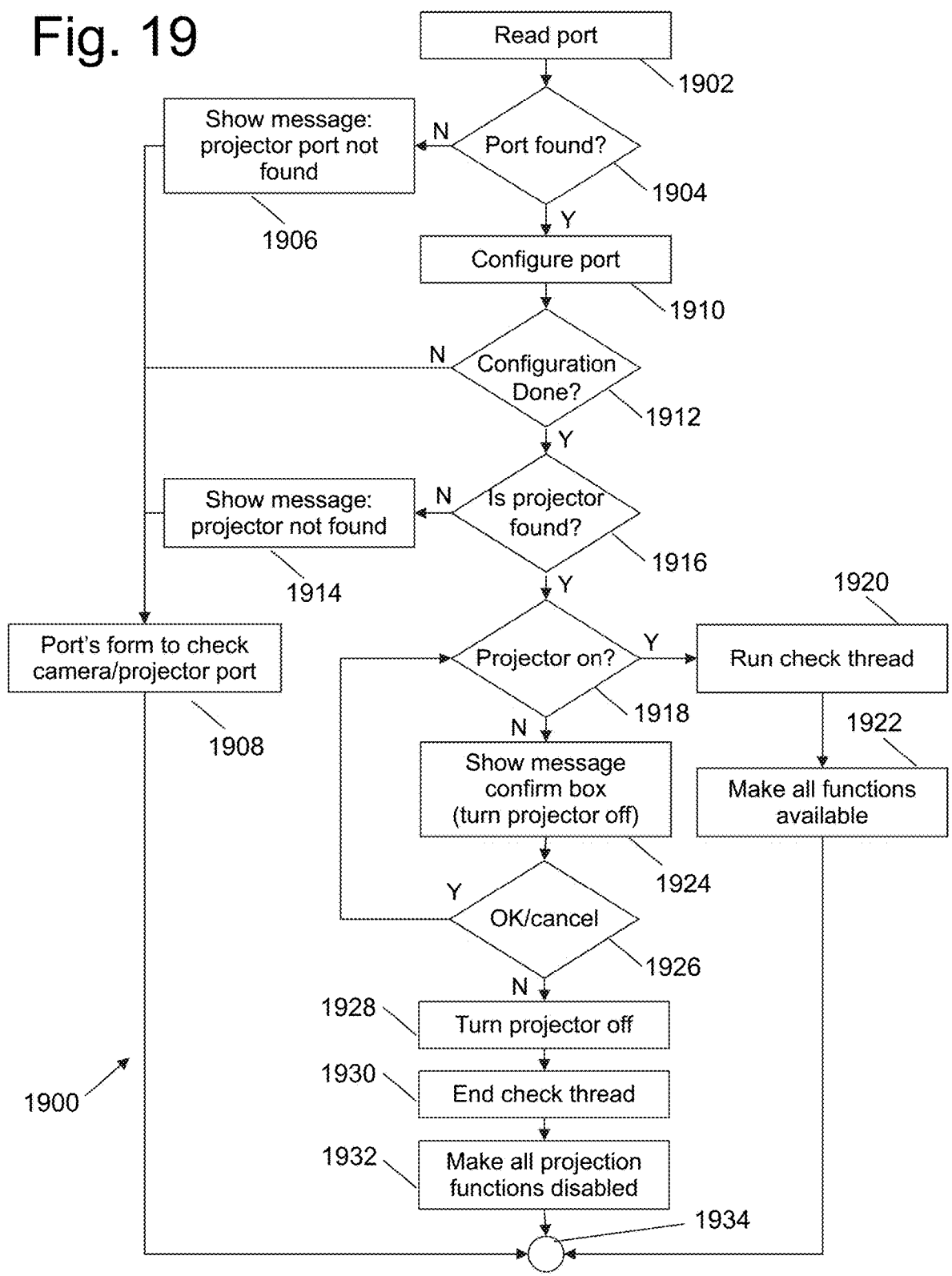
FIG. 19 is a flowchart illustrating a projector power on/off process of the multimedia station of FIG. 1.

FIG. 19 is a flowchart illustrating a sub-process 1900 for determining the status of a projector and enabling the projector functions or turning the projector off. The process 1900 begins by reading the projector port 1902. At step 1904, a determination is made to determine if the projector port is found. If yes, the projector port is configured in step 1910. If no, the process flows to step 1906 where the message "projector port not found" is displayed. The process then flows to step 1908 where the camera and projector ports are checked. If there is an error, the process displays the appropriate error. If the software can correct the error, the software will attempt to do so and the process flows back to step 1902. If not, the appropriate message will be displayed to assist the user or operator and the process flows to step 1934 where the sub-process ends.

In step 1912, a check is performed to determine the configuration status. If the configuration is complete, the process flows to step 1912. If not, the process flows to step 1908 where the camera and projector ports are checked. In step 1916, a check is performed to determine if the projector is found. If yes, the process flows to step 1918. If not, the process flows to step 1914 where the message "projector not found" is displayed. The process then flows to step 1908 (discussed above).

In step 1918, a check is performed to determine if the projector is on. If yes, a check thread routine is performed in step 1920. The process then flows to step 1922 where all available functions for the projector are made available to the system and user. The process then flows to an end point 1934. If no, the process flows to step 1924 where the operator is shown a message or indicator to instruct the user to turn the projector on.

At step 1926, a check is made to determine if the projector has been turned on and is operating correctly. If yes, the process then flows back to step 1918. If there still is no response from the projector, the projector is turned off and the process flows to step 1928 where the projector is turned off. In step 1930, an end check process is performed. The process then flows to 1932 where the system recognizes that there is a problem with the projector. So the projector functions are disabled in step 1932, but all other functions may be operable and the process flows to 1934 where the overall initialization process continues.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. A classroom presentation and recording system, comprising:
    an enclosure for enclosing a plurality of components, the plurality of components including:
        a computer, a touch screen display in communication with the computer, a projector in communication with the computer, a document camera in communication with the computer positioned to generally face the touch screen display, a radio in communication with the computer, wherein the radio is configured to act as a wireless access point for creating an independent wireless local network, a main power controller for allowing a user to turn on or off the powered components using a single button;

wherein the computer includes
a processor,
memory coupled to the processor,
software instructions residing in the memory for initializing the document camera and the projector, wherein the enclosure includes:
a plurality of wheels coupled to an underneath surface of the enclosure to allow the enclosure to be moveable, two sliding trays coupled to a first rail system, configured such that in a closed position, the two sliding trays abut each other to cover the touch screen display, and in an open position, the two sliding trays are positioned apart from one another to expose the touch screen display;

a sliding shelf rotatably coupled to the projector and a second rail system, the sliding shelf configured such that in a closed position the projector is enclosed within the enclosure, and in an open position, the projector is position outside of the enclosure.

2. The system of claim 1, further comprising a keyboard in communication with the computer.

3. The system of claim 1, further comprising a mouse in communication with the computer.

4. The system of claim 1, further comprising a voice amplification subsystem including:
a microphone,
a speaker, and
an amplification system positioned within the enclosure, the amplification system is in communication with the microphone, speaker, and computer.

5. The system of claim 1, further comprising:
a first side door positioned adjacent to a first opening defined within the enclosure,
a second side door positioned adjacent to a second opening defined within an opposing side of the enclosure and positioned such that the first side door opposes the second side door such that the sliding shelf can project through either the first side opening or the second side opening.

6. The system of claim 1, further comprising:
a human motion interface sensor for capturing motions by a user;
additional software processes residing in the memory of the computer for interpreting the captured motions and for using the captured motions to control application programs running on the computer.

7. The system of claim 6, wherein the human motion interface sensor includes a microphone system for capturing voice input signals to control the application programs.

8. The system of claim 1, wherein the radio is configured to access a facility's wireless network.

9. The system of claim 1, further comprising an audio-visual recording subsystem for automatically recording classroom lessons into a video file.

10. The system of claim 9, wherein the audio-visual recording subsystem includes
the computer,
a human motion interactive sensor, and
the document camera.

* * * * *